United States Patent [19]

Miida et al.

[11] Patent Number: 4,849,619
[45] Date of Patent: Jul. 18, 1989

[54] PHASE DIFFERENCE DETECTOR WITH ANALOG SIGNALS

[75] Inventors: Takashi Miida; Ryuji Kondo; Jin Murayama; Masatoshi Tabei; Nozomu Ozaki, all of Kanagawa, Japan

[73] Assignee: Fuji Photo Film Co., Ltd., Kanagawa, Japan

[21] Appl. No.: 95,493

[22] Filed: Sep. 11, 1987

[30] Foreign Application Priority Data

| Sep. 11, 1986 | [JP] | Japan | 61-212720 |
| Sep. 11, 1986 | [JP] | Japan | 61-212721 |
| Sep. 22, 1986 | [JP] | Japan | 61-222211 |
| Apr. 30, 1987 | [JP] | Japan | 62-104493 |
| Jun. 12, 1987 | [JP] | Japan | 62-145389 |

[51] Int. Cl.[4] .............................................. G01J 1/20
[52] U.S. Cl. ................................... 250/201; 354/408
[58] Field of Search ............... 250/201; 354/401, 407, 354/408; 356/1, 4

[56] References Cited

U.S. PATENT DOCUMENTS

| 4,178,098 | 12/1979 | Asano et al. ...................... 250/201 |
| 4,559,446 | 12/1985 | Suzuki ............................... 250/201 |
| 4,560,863 | 12/1985 | Matsumura et al. .............. 250/201 |
| 4,575,626 | 3/1986 | Oinoue et al. ..................... 250/201 |
| 4,602,153 | 7/1986 | Suzuki ............................... 250/201 |
| 4,621,191 | 11/1986 | Suzuki et al. ..................... 250/201 |

*Primary Examiner*—David C. Nelms
*Assistant Examiner*—Michael Messinger
*Attorney, Agent, or Firm*—Sughrue, Mion, Zinn, Macpeak & Seas

[57] ABSTRACT

A phase difference detector of the type capable of distinguishing a focused state by detecting relative positions of a pair of optical images obtained from an object, comprises sensor means adapted to photoelectrically convert the pair of optical images and to output a first analog electrical signal corresponding to one of the optical images and a second analog electrical signal corresponding to the other optical image, the signals being generated by the photoelectric conversion, at a predetermined period and in a non-destructive manner, and analog arithmetic means for subjecting the pair of analog electrical signals output from the sensor means to a correlative arithmetic operation.

6 Claims, 16 Drawing Sheets

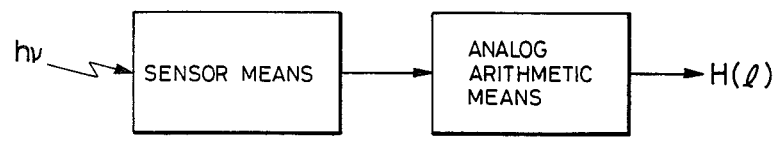
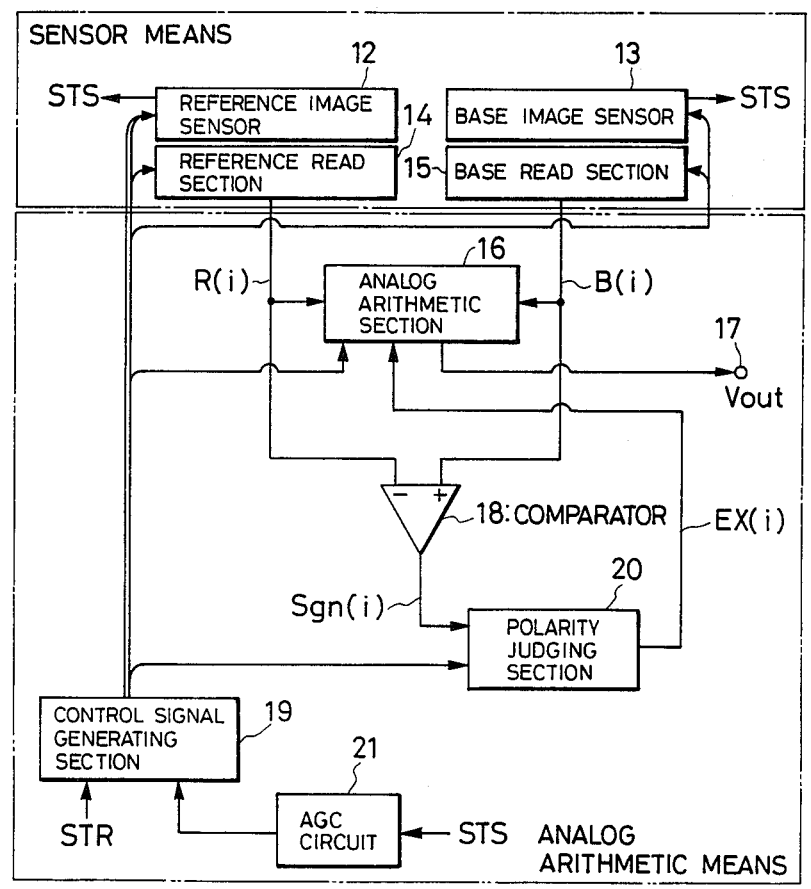

PHASE DIFFERENCE DETECTOR WITH ANALOG SIGNALS

BACKGROUND OF THE INVENTION

The present invention relates to a phase difference detector for use in, for example, an automatic focus detector for a camera. More particularly, the present invention relates to a phase difference detector designed to execute arithmetic processing for phase difference detection by an analog signal processing method.

A typical conventional automatic focus detector for a camera has heretofore been arranged as shown in FIG. 20. More specifically, a condenser lens 3, a separator lens 4 and a phase difference detector are disposed to the rear of a film equivalent plane 2 which is in turn positioned to the rear of a photographic lens 1.

The phase difference detector comprises line sensors 5, 6 defined by CCDs or the like which receive rays of light carrying a pair of images formed by the separator lens 4. The CCDs subject the received light to photoelectric conversion, and a processing circuit 7 distinguishes a focused state on the basis of signals generated in the picture elements of the line sensors 5, 6 in accordance with luminance intensity distributions.

When the subject image is focused forwardly of the film equivalent plane 2, that is, in the case of front mis-focus, the images formed on the line sensor 5, 6 are close to the optical axis 8, whereas, in the case of rear mis-focus, said images are remote from the optical axis 8. When the subject image is correctly focused, the images formed on the line sensors 5, 6 are at predetermined positions intermediate those in the front mis-focus and the rear mis-focus conditions. Accordingly, the processing circuit 7 detects the positions of the formed images relative to the optical axis 8 to thereby distinguish the focused state.

The phase difference detection technique is employed to detect the positions of the images formed on the line sensors 5, 6. According to this technique, a correlation value of a pair of images formed on the line sensors 5, 6 is obtained by an arithmetic operation based on the following formula (1), and a focused state is distinguished on the basis of the amount of relative movement (phase difference) of these images required until the correlation values reaches a minimum:

$$H(l) = \sum_{k=1}^{n} |B(k) - R(k + l - 1)| \quad (1)$$

where l is an integer having a value of 1 to 9 and represents the above-described amount of relative movement.

For example, B(k) represents signals which are respectively output from the picture elements of the line sensor 5 in a time serial manner, while R(k+l−1) represents signals respectively output from the picture elements of the line sensor 6 in a time serial manner, and if the arithmetic processing of the above-described formula (1) is the executed every time l is changed from 1 to 9, correlation values H(1), H(2) ... H(9) are obtained. The focused state is detected when, for example, the correlation value H(5) is at a minimum value, and if a correlation value at a position which is offset from the focused position is at a minimum value, the amount of offset, that is, the phase difference corresponding to l=5, can be detected as the amount by which the subject image is out of focus.

The arrangement of the conventional processing circuit 7 is shown in FIG. 21. Analog electric signals B(k) and R(k) respectively generated from the picture elements of the line sensors 5, 6 are converted into, for example, 8-bit digital data, by means of an A/D converter 9, and the digital data is temporarily stored in a RAM (Random Access Memory) 11 through a microcomputer 10. Thereafter, the arithmetic processing of the above-described formula (1) is executed on the basis of the stored digital data.

The conventional phase difference detector of the type described above suffers, however, from the following problems. Since the arithmetic operation is executed by digital signal processing using a microcomputer or the like, a costly A/D converter or the like is needed in order to effect a high-speed and high-precision arithmetic operation. In addition, there will be produced a rounding error attributable to the restriction on the number of quantizers and the like which perform arithmetic operations, and this leads to a lowering in the degree of accuracy of the arithmetic operation. Further, the work which is needed to design a computer program for the arithmetic process is increased, and it is necessary to provide a memory for storing a large amount of digital data. For these reasons, the number of required parts is increased, and the size of the apparatus is thus enlarged, disadvantageously.

SUMMARY OF THE INVENTION

In view of the above-described problems, it is an object of the present invention to provide a phase difference detector which is capable of executing a phase difference detection arithmetic operation for detecting the focused state of the subject image at high speed and with a high degree of accuracy and which has a simplified arrangement suitable for incorporation in a single integrated circuit device.

To this end, the present invention provides a phase difference detector designed to distinguish the focused state by detecting relative positions of a pair of optical images obtained from an object, wherein the improvement comprises: sensor means adapted to photoelectrically convert the pair of optical images and to output analog signals corresponding to the optical images, the signals being generated by photoelectric conversion, at a predetermined period and in a non-destructive manner; and analog arithmetic means for subjecting the pair of analog signals output from the sensor means to a correlative arithmetic operation, whereby high-speed and high-precision phase difference detection is effected by analog signal processing in place of digital signal processing.

BRIEF DESCRIPTION OF THE DRAWINGS

FIG. 1 is a block diagram showing the basic arrangement of the phase difference detector according to the present invention;

FIG. 2 is a block diagram of one embodiment of the phase difference detector according to the present invention;

DETAILED DESCRIPTION OF THE PREFERRED EMBODIMENTS

Preferred embodiments of the phase difference detector according to the present invention will be described hereunder.

Figure 8:
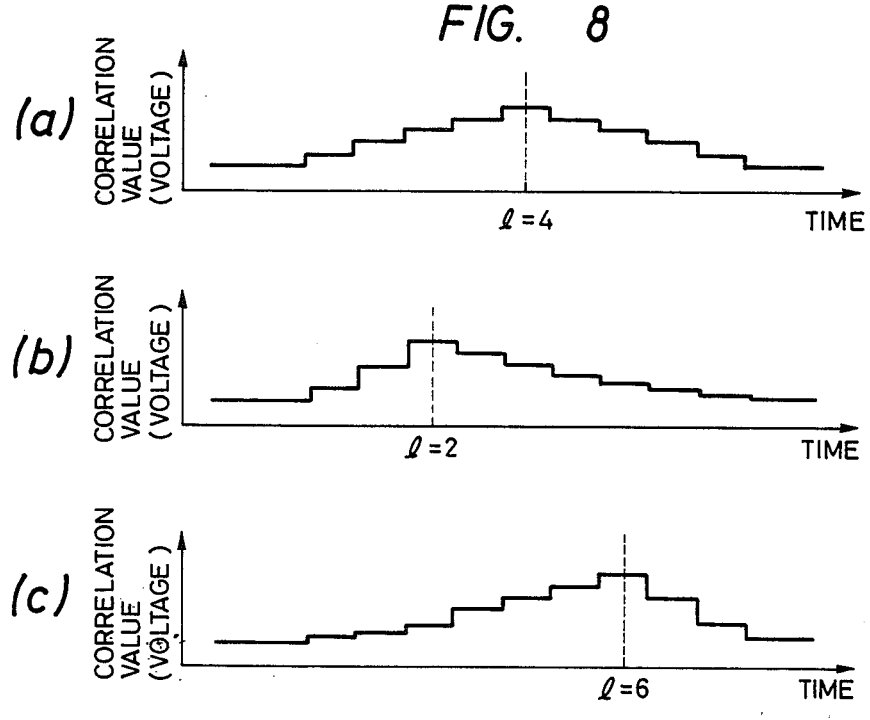
FIG. 8 shows the principles of judging a focused state from correlation values.

The basic arrangement of the present invention will first be explained with reference to FIG. 1. The phase difference detector according to this embodiment has a sensor means which has photoelectric conversion means corresponding to the line sensors 5, 6 shown in FIG. 8 and which outputs signals generated from the photoelectric conversion means in the form of analog signals at a predetermined timing and in a time serial manner through a non-destructive read means employing floating gates, and an analog arithmetic means which subjects the analog signals output from the sensor means to arithmetic processing equivalent to the above-described formula (1) to thereby output a correlation value H(l).

Figure 20:
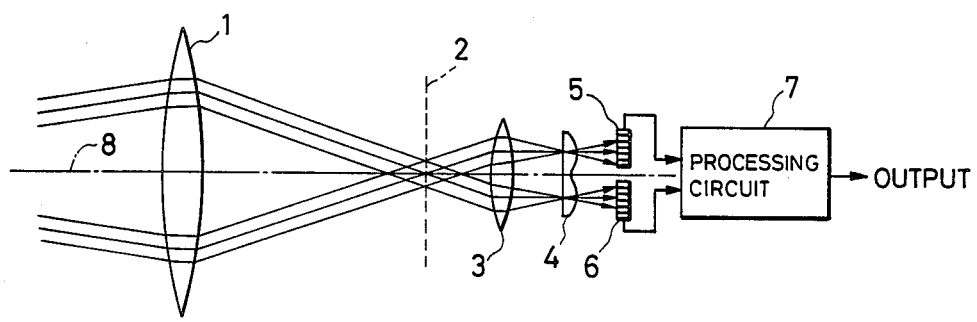
FIG. 20 schematically shows the arrangement of a conventional automatic focus detector.
Figure 21:
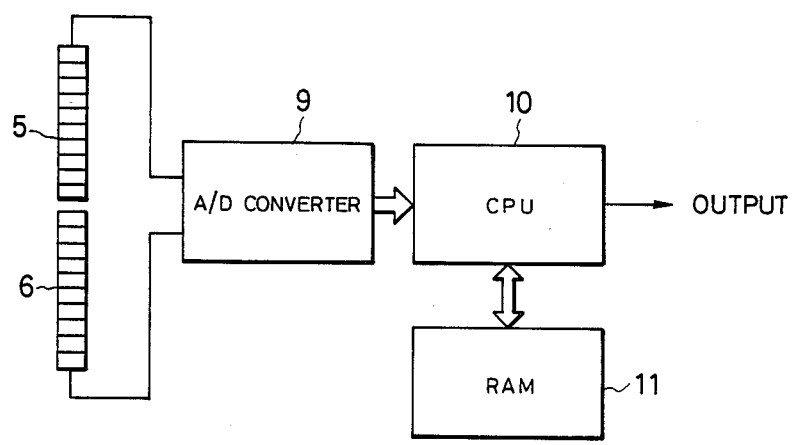
FIG. 21 is a block diagram showing the arrangement of the phase difference detector shown in FIG. 20.

The arrangement of this embodiment will next be described in detail with reference to FIG. 2 which corresponds to FIG. 1. The arrangement of the sensor means will first be explained. A reference image sensor 12 and a base image sensor 13 correspond to the line sensors 5 and 6, respectively, shown in FIG. 20, and have respective CCDs (charge-storage devices) that transfer a signal charge generated in each picture element by means of a plurality of charge transfer elements.

Reference read section 14 and a base read section 15 are adapted to output analog signals (hereinafter referred to as "picture element signals") concerning the subject image which are photoelectrically converted in the image sensors 12 and 13, at a predetermined timing and in a time serial manner.

The arrangement of the analog arithmetic means will next be explained. An analog arithmetic section 16 performs an arithmetic operation for phase difference detection on the basis of picture element signals R(i) and B(i) for each picture element which are output from the reference and base read sections 14 and 15, and outputs the result of the arithmetic operation to an output terminal 17.

A comparator 18 compares the picture element signals R(i) and B(i) in terms of the size of voltage or current level and outputs a polarity signal Sgn(i).

A control signal generating section 19 generates various control signals for controlling operation timing in the whole of the apparatus, for example, a charge transfer clock signal for causing the CCDs in the image sensors 12, 13 to perform the transfer operation, and a control signal allowing the read sections 14 and 15 to output the picture element signals R(i) and B(i) at a predetermined timing synchronized with the charge transfer clock signal.

A polarity judging section 20 receives the polarity signal Sgn(i) generated synchronously with the output timing of the picture element signals R(i) and B(i), makes a judgment as to whether the difference between the picture element signals R(i) and B(i), i.e., B(i)−R(i), is plus or minus, and supplies a polarity switching signal EX(i) (described later) to the analog arithmetic section 16. It should be noted at this point that such a polarity judgment is made in order to enable the absolute value of the difference between the picture element signals R(i) and B(i) shown in the above-described formula (1) to be integrated by subjecting said difference to an integration operation in accordance with the polarity thereof.

An AGC circuit 21 detects signal charges respectively generated in the picture elements of the image sensors 12 and 13 and, upon detecting the signal charges reaching a predetermined charge quantity, the AGC circuit 21 instructs the control signal generating section 19 that the arithmetic operation for phase difference detection should be started.

Figure 3:
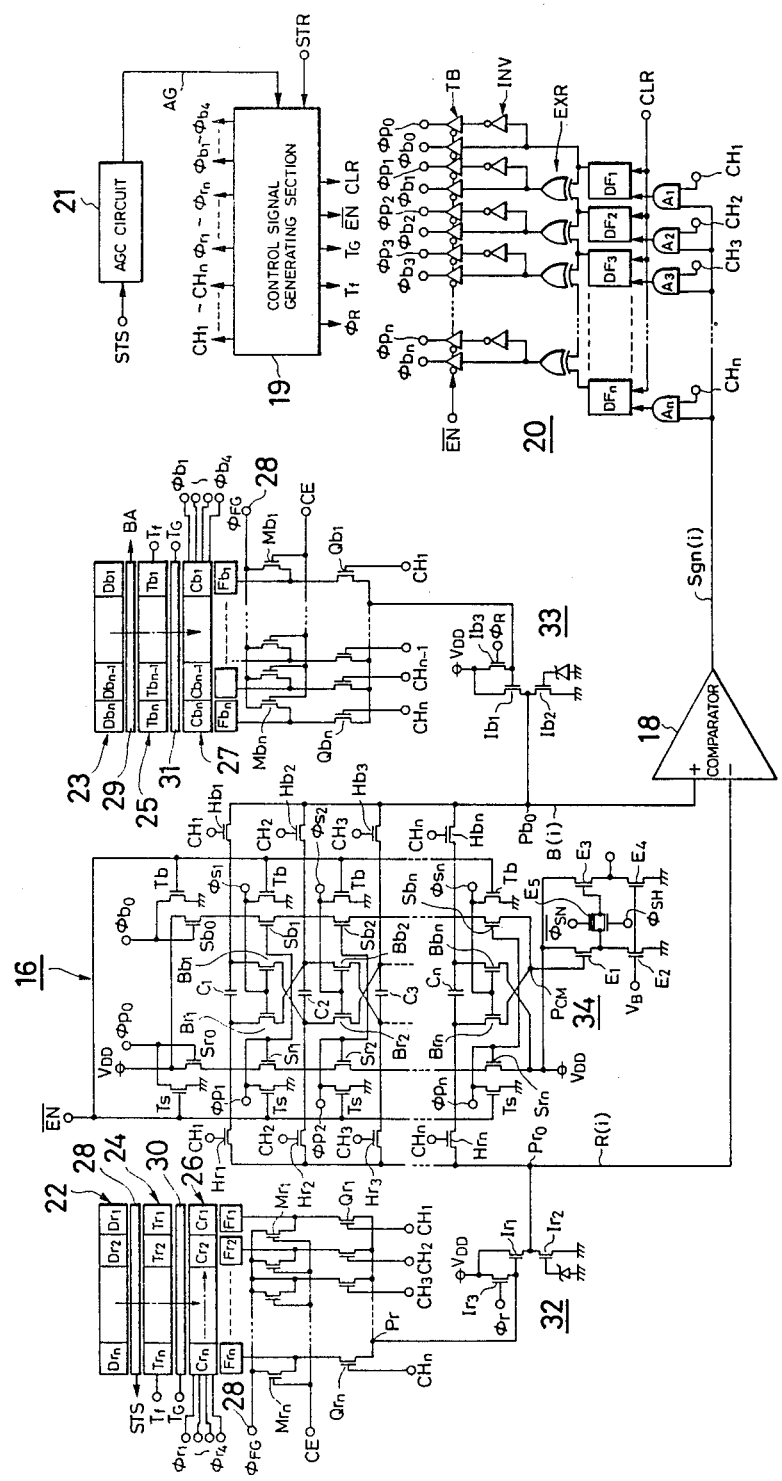
FIG. 3 is a circuit diagram showing a practical circuit configuration of the embodiment shown in FIG. 2.

FIG. 3 shows an even more practical circuit which is arranged on the basis of the block diagram shown in FIG. 2. The circuit will be described in correspondence with each of the blocks shown in FIG. 2. The reference and base image sensors 12 and 13 have substantially the same arrangement. More specifically, the image sensors 12 and 13 respectively comprise light-receiving sections 22 and 23 having photoelectric transducers Dr1 to Drn and Db1 to Dbn which define the picture elements thereof, storage sections 24 and 25 constituted by CCDs which are provided in order to store signal charges generated in the respective light-receiving sections 22 and 23 for each picture element, and shift register sections 26 and 27 constituted by CCDs which are supplied with signal charges transferred by the storage sections 24 and 25 and which (in the case of register section 26) transfer the charges horizontally.

More specifically, the storage sections 24, 25 and the shift register sections 26, 27 have charge transfer elements Tr1 to Trn, Tb1 to Tbn, Cr1 to Crn, and Cb1 to Cbn which correspond to the photoelectric transducers Dr1 to Drn and Db1 to Dbn, respectively. The storage sections 24 and 25 transfer the signal charges to the shift register sections 26 and 27 in parallel, and the shift register section 26 transfers the signal charges horizontally. It should be noted that, unlike the shift register section 26, the shift register section 27 on the base image sensor side does not effect the horizontal transfer of the signal charges (as described later).

The reference numerals 28 and 29 denote conductive layers which are respectively formed on the surfaces of channel regions which move the signal charges from the light-receiving sections 22, 23 to the storage sections 24, 25. The conductive layers are formed from polycrystalline silicon layers to define potential barriers.

The reference numerals 30, 31 denote transfer gates which control the movement of the signal charges.

Further, floating gates Fr1 to Frn and Fb1 to Fbn are formed adjacent to the charge transfer elements Cr1 to Crn and Cb1 to Cbn, respectively. The floating gates Fr1 to Frn and Fb1 to Fbn are connected to a reset terminal RES through MOS type FETs Mr1 to Mrn and Mb1 to Mbn, respectively, each supplied at its gate with a control signal CE, and are also connected to common contacts Pr and Pb through MOS type FETs Qr1 to Qrn and Qb1 to Qbn which perform a multiplex operation in response to channel switching signals CH1 to CHn applied to their gates. The common contacts Pr and Pb are connected to contacts Pr0 and Pb0 through impedance transformer circuits 32 and 33, respectively.

The impedance transformer circuits 32 and 33 have the same circuit configuration. More specifically, the circuits 32 and 33 have MOS type FETs Ir1, Ir2 and Ib1, Ib2 for series-connecting the drain-source path between a power supply $V_{DD}$ and a grounding terminal, and MOS type FETs Ir3 and Ib3 which are respectively parallel-connected between the gates and sources of the MOS type FETs and Ir1 and Ib1 and are adapted to clamp the common contacts Pr and Pb to the power supply $V_{DD}$ in response to the application of a refresh signal $\phi R$, the gates of the MOS type FETs Ir2 and Ib2 being biased at a predetermined potential.

Figure 4:
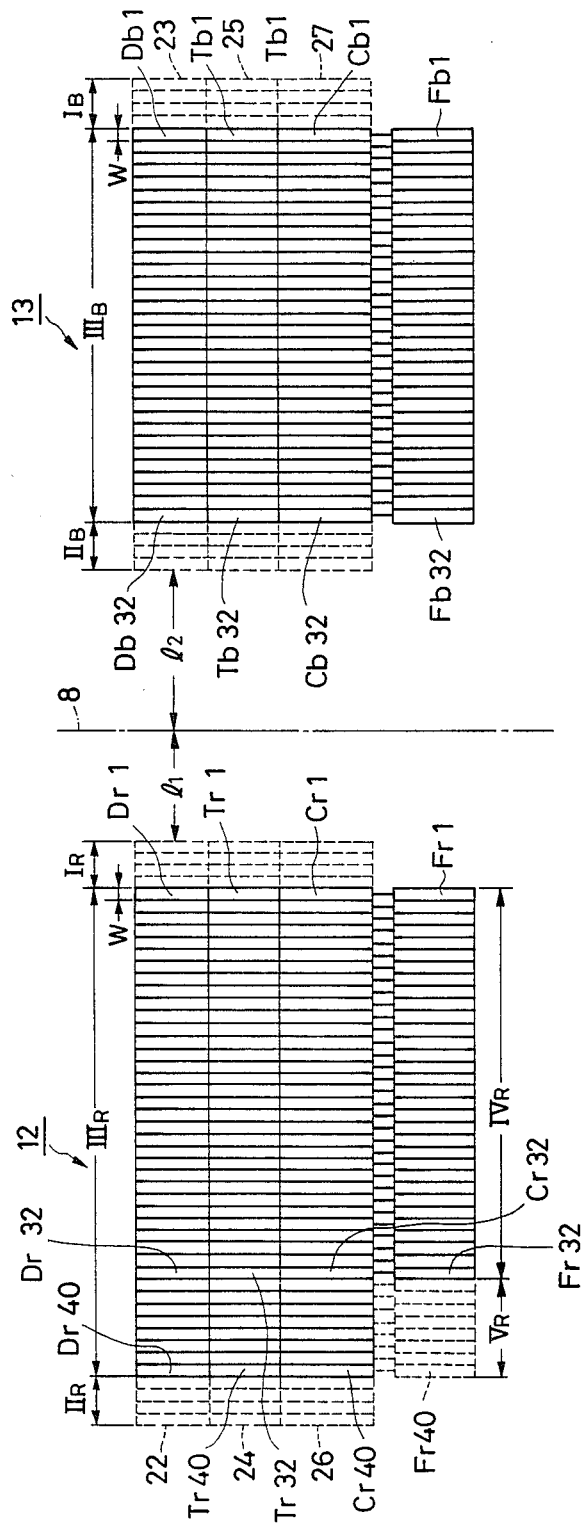
FIG. 4 shows the arrangement of the light-receiving sections, storage sections, shift register sections and floating gates in the reference and base units.

The positional relationship between the shift register sections 26, 27 and the floating gates Fr1 to Frn, Fb1 to Fbn will next be described with reference to FIG. 4.

Each of the light-receiving section 22, the storage section 24 and the shift register section 26 which constitute in combination the reference image sensor 12 has 48 photoelectric transducers or charge transfer elements formed at equal pitch widths W. The floating gates Fr1 to Fr40 are provided so as to be associated with 40 charge transfer elements Cr1 to Cr40, respectively, which constitute a third block IIIR. The remaining 8 charge transfer elements constitute first and second blocks IR and IIR at each end, each of the blocks IR and IIR consisting of four charge transfer elements. The floating gates are further divided into two blocks, that is, a fourth block IVR consisting of 32 floating gates Fr1 to Fr32 and a fifth block VR consisting of the remainder. One end of each of the floating gates Fr1 to Fr40 is connected to the reset terminal RES through the corresponding one of the MOS type FETs Mr1, Mr2 . . . shown in FIG. 3, and the floating gates Fr1 to Fr32 are connected to the contact Pr through the MOS type FETs Qr1 to Qrn shown in FIG. 3. More specifically, FIG. 3 representatively shows the third and fourth blocks IIIR and IVR shown in FIG. 4, but the first, second and fifth blocks IR, IIR and VR are not shown in FIG. 3. The latter three blocks define spare regions which operate when signal charges are transferred horizontally.

On the other hand, each of the light-receiving section 23, the storage section 25 and the shift register section 27 which constitute in combination the base image sensor 13 has 40 photoelectric transducers or charge transfer elements formed at equal pitch widths W (which are equal to those in the reference image sensor 12). The floating gates Fb1 to Fb32 are provided so as to be associated with 32 charge transfer elements Cb1 to Cb32, respectively, which constitute a third block IIIB. The remaining 8 charge transfer elements constitute first and second blocks IB and IIB at each end, each of the blocks IB and IIB consisting of four charge transfer elements. One end of each of the floating gates Fb1 to Fb32 is connected to the corresponding one of the MOS type FETs Mb1 to MBn and Qb1 to Qbn shown in FIG. 3. In other words, FIG. 3 shows the third block IIIB shown in FIG. 4.

The light-receiving section 22 is formed so as to be a distance l1 away from the optical axis, while the light-receiving section 23 is formed so as to be away from the optical axis by a distance l2 which is determined by adding a 4-pitch width 4W to the distance l1 (i.e., $l2 = l1 + 4 \cdot W$).

The phase difference detector in accordance with this embodiment is fabricated on a single chip in the form of a semiconductor integrated circuit device. The structure of the chip will be described hereinunder with reference to FIG. 5 which is schematic sectional view showing essential parts of the phase difference detector, that is, from the image sensor 22 (23) to the floating gates Fr1 to Frn (Fb1 to Fbn).

Figure 5:
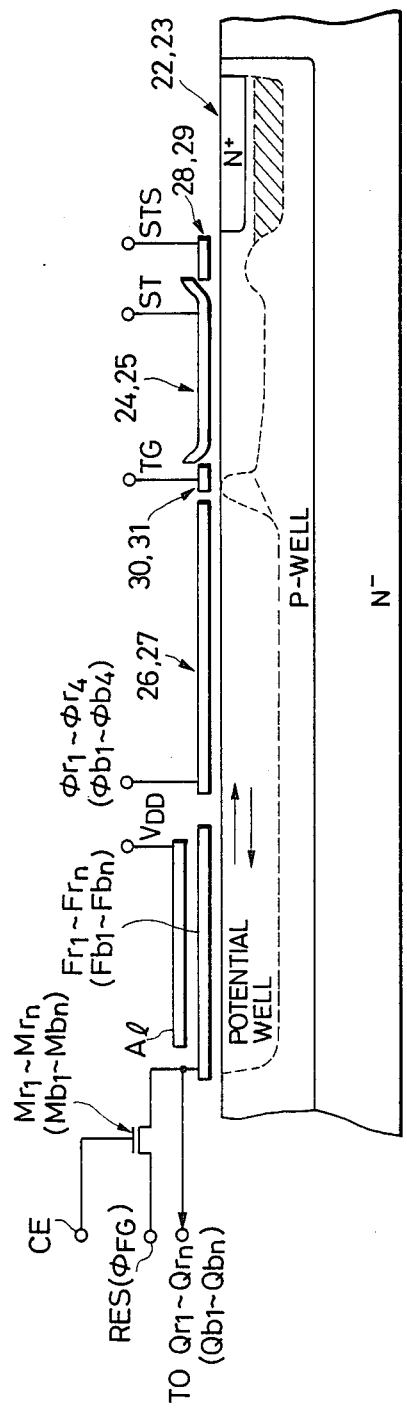
FIG. 5 is a fragmentary vertical sectional view schematically showing the light-receiving section, storage section, shift register section and floating gates.

In FIG. 5, a P-type diffused layer (P-well) is formed in the surface portion of the an N-type semiconductor substrate, and a plurality of N+-type layers are formed in a part of the P-type diffused layer to thereby define photoelectric transducers constituting the light-receiving sections 22 (23).

Further formed on the semiconductor substrate through a $SiO_2$ layer (not shown) are the signal barrier 28 (29), a transfer gate electrode layer constituting each of the charge transfer elements of the storage section 24 (25), a gate electrode layer constituting the transfer gate 30 (31), and a transfer gate electrode layer constituting each of the charge transfer elements of the shift register section 26 (27). Further, a polycrystalline-silicon layer for defining the floating gates Fr1 to Frn and Fb1 to Fbn and an electrode layer Al which is clamped to the power supply $V_{DD}$ are stacked adjacent to the shift register sections 26 and 27. The electrode layer Al is formed in such a manner as to cover the whole of the upper surfaces of the plurality of floating gates Fr1 to Frn and Fb1 to Fbn. Each of the MOS type FETs Mr1 to Mrn and Mb1 to Mbn is connected to one end of the corresponding one of the floating gates.

In this arrangement, a reset signal $\phi FG$ which is applied to the reset terminal RES is brought to a potential equal to the power supply $v_{DD}$, and the floating gates Fr1 to Frn and Fb1 to Fbn are clamped to the power supply $V_{DD}$ by a control signal CE of "H" level through the MOS type FETs Mr1 to Mrn and Mb1 to Mbn which are thereafter cut off again. In consequence, deep potential wells are formed within the semiconductor substrate as shown by the chain line in FIG. 5, so that the signal charges in the shift register section 26 (27) flow into the regions under the floating gates. Changes in voltage are generated in the floating gates Frl to Frn (Fbl to Fbn), respectively, in accordance with the amounts of signal charge flowing into the regions. Thus, the pattern of the image formed on the light-receiving section 22 (23) can be detected in the form of voltage signals.

On the other hand, when the floating gates Frl to Frn and Fbl to Fbn are shifted to the "L" level by bringing the reset terminal RES to the ground potential and then turning ON the MOS type FETs Mrl to Mrn and Mbl to Mbn, the potential wells within the regions under the floating gates become shallow, so that it is possible to return the signal charges to the shift register section 26 (27) again. Since such movement of signal charges is carried out in a non-destructive manner, reading of signal charges can be repeated any number of times.

The signals which are generated through the floating gates Frl to Frn and Fbl to Fbn in this way are converted into time series signals R(i) and B(i) by the multiplex operation of the MOS type FETs Qrl to Qrn and Qbl to Qbn and output to the respective output contacts PrO and PbO.

The arrangement of the analog arithmetic section 16 in the analog arithmetic means will next be explained with reference to FIG. 3. In the figure, the reference characters C1, Cs ... Cn denote capacitors having equal capacitances. Ends of each of the capacitors are connected to the contacts PrO and PbO, respectively, through the corresponding MOS type FETs Hrl to Hrn and Hbl to Hbn. The MOS type FETs Hrl to Hrn and Hbl to Hbn perform a demultiplex operation for supplying signals generated at the contacts PrO and PbO to the corresponding capacitors Cl to Cn under the control of channel switching signals CHl to CHn described later.

The capacitors which are adjacent to each other, that is, C1 and C2; C2 and C3; ... ; and Cn−1 and Cn, are connected in parallel at both ends through MOS type FETs Srl to Srn and Sbl to Sbn which are controlled by polarity switching signals $\phi pl$ to $\phi pn$. The adjacent capacitors are also connected through MOS type FETS Brl to Brn and Bbl to Bbn which are controlled by the other polarity switching signals $\phi sl$ to $\phi sn$ and which are disposed crosswise. Both ends of the capacitor Cl in the first stage are connected to the power supply $V_{DD}$ through MOS type FETs Sr0 and Sb0 which are controlled by clamp control signals $\phi r0$ and $\phi b0$, respectively. There are further provided MOS type FETs Ts and Tb which connect the respective gates of the MOS type FETs Sr0 to Srn, Sbl to Sbn, Brl to Brn, and Bbl to Bbn, to the grounding terminal under the control of an enable signal EN.

The output-side nodes of the MOS type FETs Srn and Bbn which are connected to the capacitor Cn in the final stage are connected to the power supply $V_{DD}$, while the output-side nodes of the MOS type FETs Brn and Sbn are connected to an output buffer amplifier 34 through a common contact PCM.

The output buffer amplifier 34 has two pairs of MOS type FETs E1, E2 and E3, E4 which have the drain-source paths series-connected between the power supply $V_{DD}$ and the grounding terminal, and a transmission gate element E5 which is connected between the node between the MOS type FETs E1 and E2 and the gate of the MOS type FET E3, the gates of the MOS type FETs E2 and E4 being biased at a predetermined potential $V_B$. The signal which is supplied to the MOS type FET E1 from the common contact PCM is sampled and held by the ON/OFF operation of the transmission gate element E5 which is controlled by control signals $\phi SH$ and $\overline{\phi}SH$, and the signal is then output to the output terminal 17.

The operation of the analog arithmetic section 16 will briefly be explained. The picture element signals R(i) and B(i), which are read out at a predetermined timing and in a time serial manner by the multiplex operation of the MOS type FETs Qrl to Qrn and Qbl to Qbn of the reference and base read sections 14 and 15, are divided by means of the MOS type FETs Hrl to Hrn and Hbl to Hbn which perform a demultiplex operation synchronously with said timing and the divided signals are supplied to predetermined capacitors Cl to Cn, respectively. Accordingly, the capacitors Cl to Cn are charged with signals corresponding to signal charges respectively generated in the picture elements in the reference and base image sensors 12 and 13. It should be noted that the MOS type FETs Sr0 to Srn, Sbl to Sbn, Brl to Brn, and Bbl to Bbn are assumed to be in a cut-off state during the charging period.

More specifically, representing the time serial picture element signal appearing at the contact Pr0 by R(i), the time serial signal appearing at the contact Pb0 by B(i), and the charges accumulated in the capacitors Cl to Cn by q(1), q(2) ... q(i) ... q(n), respectively, the following formula holds:

$$q(i) = \text{Sgn}(i) \cdot B(i) - R(i) \qquad (2)$$

where i=i to n.

It should be noted that Sgn(i) represents the polarity which is determined in accordance with the voltage size of the signals R(i) and B(i), and when $B(i) \geq R(i)$, Sgn(i) is plus ("H" logical value), whereas, when $B(i) < R(i)$, Sgn(i) is minus ("L" logical value). Thus, the polarity across each of the capacitors Cl to Cn after charging changes in accordance with the signals R(i) and B(i).

The MOS type FETs Srl to Srn, Sbl to Sbn, Brl to Brn, and Bbl to Bbn perform a switching operation for executing an integration operation of absolute values as represented by the following formula (3):

$$\sum_{i=1}^{n} |B(i) - R(i)| \qquad (3)$$

More specifically, if the adjacent capacitors C1 and C2; C2 and C3; ... ; and Cn−1 and Cn are equal in polarity to each other, the MOS type FETs Srl to Srn and Sbl to Sbn are made conductive, whereas, if the adjacent capacitors have different polarities, the MOS type FETs Brl to Brn and Bbl to Bbn are made conductive, to execute the arithmetic processing of the above-described formula (3), and the result of the arithmetic operation is generated at the output terminal 17.

The comparator 18 and the polarity judging section 20, which will next be explained, generate switching control signals $\phi pl$ to $\phi pn$ and $\phi sl$ to $\phi sn$ for effecting the above-described switching control in accordance with the polarity Sgn(i).

The comparator 18 is defined by an analog comparator which detects the voltage size relationship between the time serial signals R(i) and B(i) for each picture element generated at the contacts Pr0 and Pb0, respectively, and generates a polarity signal corresponding to Sgn(i). As described above, when $B(i) > R(i)$, the polarity signal Sgn(i) is a rectangular signal of "H" level, whereas, when $B(i) < R(i)$, the signal has "L" level.

The polarity judging section 20 comprises D flip-flop circuits DFl and DFn for storing polarity signals Sgn(i), respectively, which are supplied thereto from the comparator 18 through 2-input AND circuits A1 to A32, EXOR circuits EXR each having its input terminals respectively connected to the output terminals of each pair of adjacent D flip-flop circuits DFl to DFn, inverter circuits INV series-connected to the output terminals of the EXOR circuits, respectively, and three-state buffer circuits TB. Each of the D flip-flop circuits DFl to DFn is cleared of storage data in response to a clear signal CLR, and the other input terminals of the AND circuits Al to An are sequentially supplied with the above-described channel switching signals CHl to CHn so that the D flip-flop circuits DFl to DFn are synchronized with the operations of the MOS type FETs Qrl to Qrn, Qbl to Qbn, Hrl to Hrn, and Hbl to Hbn. The three-state buffer circuits TB are turned ON or brought into a high-impedance state in response to the enable signal EN, and output polarity switching signals $\phi p0$ to $\phi pn$ and $\phi s0$ to $\phi sn$ only when they are turned ON.

More specifically, the polarity signals Sgn(i) supplied from the comparator 18 are sequentially stored in the D flip-flop circuits DFl to DFn in synchronism with the channel switching signals CHl to CHn, and on the basis of the stored data, the EXOR circuits EXR perform an exclusive-OR operation represented by the following formula (4):

$$Sgn(i)+Sgn(i+1) \qquad (4)$$

where i=1 to n−1.

Accordingly, it is judged on the basis of the formula (4) whether or not there is a change in polarity of the adjacent capacitors Cl to Cn in the analog arithmetic section 16 after charging. When the three-state buffer circuits TB are turned ON in response to the enable signal EN, the circuits TO output the polarity switching signals $\phi p0$ to $\phi pn$ and $\phi b0$ to $\phi bn$ to the MOS type FETs Srl to Srn, Sbl to Sbn, Brl to Brn, and Bbl to Bbn in order to connect together both ends of each of the capacitors Cl to Cn in the same polar state.

The control signal generating section 19 generates at predetermined timings channel switching signals CHl to CHn of a predetermined period, a transfer clock signal Tf for the storage sections 24, 25, a gate signal TG for the transfer gates 30, 31, transfer clock signals $\phi rl$ to $\phi rf$ and $\phi bl$ to $\phi b4$ for the shift register sections 26, 27, an enable signal EN, a clear signal CLR, and control signals CE, $\phi SH$ and $\phi SH$.

Figure 6:
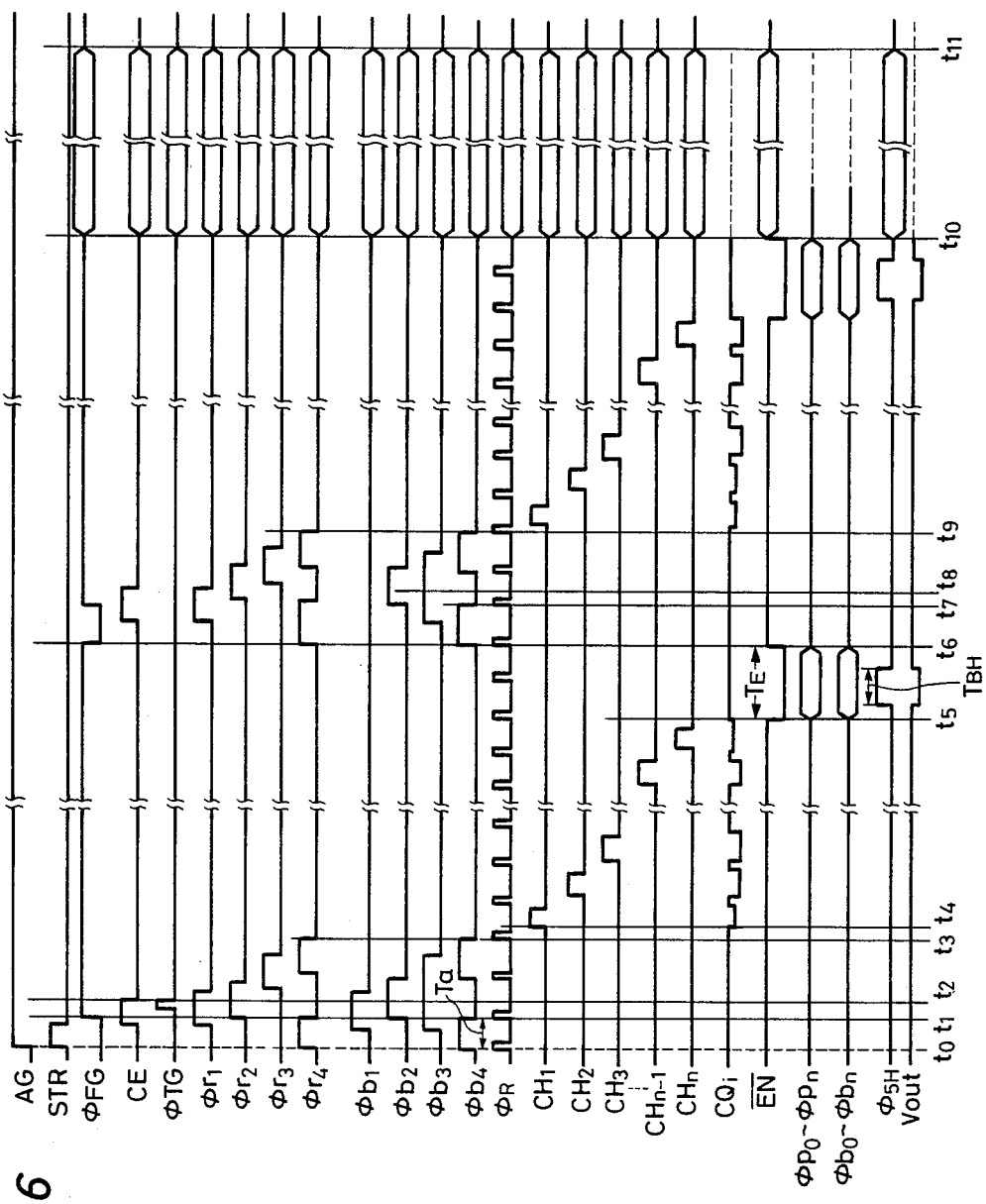
FIG. 6 is a timing chart showing the operation of the circuit shown in FIG. 3.
Figure 7:
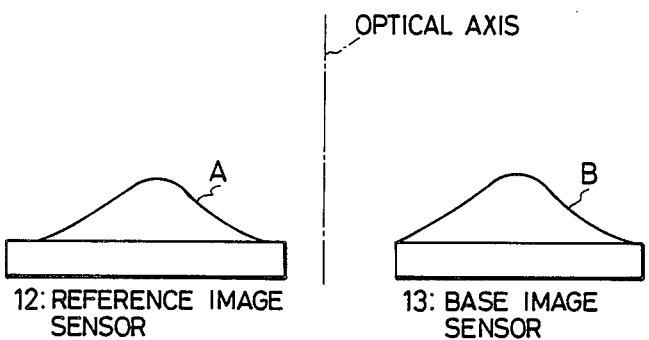
FIG. 7 is a view employed to describe the process of arithmetic processing of correlation values.

The phase difference detecting operation carried out by the phase difference detector shown in FIGS. 2 and 3 will next be described with reference to the timing chart shown in FIG. 6.

When the AGC circuit 21 detects before the time t0 that the photoelectric transducer Drl to Drn and Dbl to Dbn have generated predetermined signal charges, the AG signal is raised to the "H" level, and arithmetic processing is started in synchronism with the start signal STR (generated in response to the depression of the release button or the like of the camera) which is applied at the time T0. First, the rest signal $\phi R$ of predetermined period Ta is generated at the reset terminal 28. Further, during the period from the time t0 to the time t3, 4-phase clock signals $\phi rl$ to $\phi r4$ and $\phi bl$ to $\phi b4$ are generated to cause the charge transfer elements (see FIG. 4) of the shift register sections 26 and 27 to effect charge transfer based on the 4-phase drive system by an amount corresponding to one pitch.

At the time tl during the period of charge transfer by the charge transfer elements, the control signal CE is raised to the "H" level to turn ON the MOS type FETs Mrl to Mrn and Mbl to Mbn, and in the meantime, the reset signal $\phi FG$ is inverted from the "L" level to the "H" level. In consequence, the floating gates Frl to Fr40 and Fbl to Fb32 are clamped to the power supply voltage $V_{DD}$, and at the time T2, the control signal CE is shifted to the "L" level to bring the MOS type FETs Mrl, Mr2 ... Mbl, Mb2 ... into a high-impedance state. In consequence, the floating gates are maintained at said potential. Thus, a potential well such as that shown in FIG. 5 is formed within the semiconductor substrate under each of the floating gates. At a point of time which is slight before the time t2, the transfer gates 30 and 31 are made conductive in response to the gate signal $\phi TG$, and the signal charges in the storage sections 24 and 25 are therefore shifted to the corresponding charge transfer elements in the shift register sections 26 and 27. Until the transfer operation to the charge transfer elements is completed at the time t4, the signal charge is further moved to each of the potential wells.

During the period from the time t4 to the time t5, the channel switching signals CH1 to CH32 are output to turn ON the MOS type FETs Qrl to Qrn and Qbl to Qbn which constitute in combination a multiplexer circuit, and time serial signals for each of the picture elements are output to the contacts Pr0 and Pb0. The waveform of the signal at each of the contacts Pr0 and Pb0 appears, for example, as shown by CQi in FIG. 6. More specifically, a voltage drop which corresponds to a signal charge for each of the picture elements is generated in each of the floating gates Frl to Frn and Fbl to Fbn, and the waveform of a voltage lowered by an amount corresponding to said voltage drop with respect to the power supply voltage $V_{DD}$ appears at each of the contacts Pr0 and Pb0.

From the time t4 to the time t5, the time serial signals appearing respectively at the contacts Pr0 to Pb0 are successively compared with each other in the comparator 18, and the polarity signals Sgn(i) are stored in the D flip-flops DF1 to DFn. Further, the time serial signals are respectively supplied to specific capacitors Cl to Cn throught the MOS type FETs Hrl to Hrn and Hbl to Hbn which constitute in combination a demultiplexer circuit, and the arithmetic operation represented by the above-described formula (2) is thus performed. It should be noted that, since the enable signal EN is at the "H" level during the period from the time t4 to the time t5, the three-state buffer circuits TB are in a high-impedance state, and therefore the MOS type FETs Sr0 to Srn, Sb0 to Sbn, Brl to Brn, and Bbl to Bbn to which the polarity switching signals $\phi p0$ to $\phi pn$ and $\phi b0$ to $\phi bn$ are not applied are in an OFF state.

Next, the charging of the capacitors Cl to Cn is completed by the time t5, and the enable signal EN is then shifted to the "L" level and maintained thereat for a predetermined period of time TE during which the polarity switching signals $\phi p0$ to $\phi pn$ and $\phi b0$ to $\phi bn$ are output from the polarity judging circuit 20. In response, the MOS type FETs sr0 to Srn, Sb0 to Sbn, Brl to Brn, and Bbl to Bbn are switched to a predetermined conductive or non-conductive state, and the charges in the capacitors Cl to Cn are coupled together with their polarities made equal to each other. As the result of this coupling of charges, averaged equal charges are distributed in the capacitors C1 to Cn. In response to the control signals φSH and φSH supplied to the output buffer amplifier 34 during the period of time TSH, the voltage across each of the capacitors C1 to Cn is sampled and held, and a signal Vout [corresponding to H(l)] representative of a correlation value is output to the output terminal 17.

By the above-described processing executed from the time t0 t0 the time t6, the patterns A and B of a pair of subject images which are respectively incident on the reference and base image sensors 12 and 13 are subjected to an arithmetic operation to obtain a difference for each of the picture elements and the absolute value of the difference is integrated as shown in 7. Thus, the correlation value H(1) in the following formula (5) is obtained:

$$H(1) = \sum_{i=1}^{n} |B(i) - R(i)| \tag{5}$$

It should be noted that, since the reference and base image sensors 12 and 13 are positioned at different distances l1 and l2, respectively, with respect to the optical axis of the photographic lens, the correlation value H(1) between patterns which are correspondingly offset with respect to each other is obtained.

Next, during the period from the time t6 to the time t9, charge transfer for one pitch is effected by the shift register section 26 on the reference unit side.

First, during the period from the time t6 to the time t7, the reset signal φFG is shifted to the "L" level, and the control signal CE is inverted from the "L" level to the "H" level during this period. In consequence, the floating gates Fr1 to Fr40 and Fb1 to Fb32 (see FIGS. 4 and 5) are clamped to the ground level. Accordingly, the potential wells within the semiconductor substrate become shallow as shown by the chain line in FIG. 5, and the signal charges are thus returned to the original charge transfer elements Cr1 to Cr40 and Cb1 to Cb32.

The signal charges in the charge transfer elements Cr1 to Cr40 are transferred toward the optical axis 8 by one pitch in synchronism with the 4-phase clock signals φr1 to φrn. The control signal CE is shifted to the "L" level at the time t8 in the course of this transfer operation to bring the MOS type FETs Mr1, Mr2 . . . into a high-impedance state. Since the rest signal φFG is at the "H" level at the time t8, deep potential wells are formed under the floating gates Fr1 to Fr40 again, so that the signal charges which have been shifted by one pitch move to the potential wells again by the time t9 by which the transfer operation is completed.

On the other hand, the signal charges are also returned to the charge transfer elements Cb1 to Cb32 on the base unit side by an operation similar to the above. However, no transfer operation through one pitch is performed due to the waveforms of the third and fourth transfer clock signals φb3 and φb4. Accordingly, the signal charges which have not been shifted are moved to the potential wells under their original floating gates Fb1 to Fb32.

Next, during the period from the time t9 to the time t10, the same processing as that carried out during the period from the time t3 to the time t6 is executed, and the correlation value H(2) between the pattern which is shifted by one pitch in the shift register section 26 and the pattern which is not shifted in the shift register section 27 is output from the output terminal 17. In other words, the correlation value H(2) is represented as follows:

$$H(2) = \sum_{i=1}^{n} |B(i) - R(i+1)| \tag{6}$$

Next, during the period from the time t10 to the time t11, the same processing as that carried out during the period from the time t6 to the time t10 is repeated a predetermined number of times, thus obtaining correlation values between the pattern which is shifted successively in the shift register section 26 and the pattern which is not shifted in the shift register section 27.

The above-described processing may be represented as follows:

$$H(l) = \sum_{i=1}^{n} |B(i) - R(i+l-1)| \tag{7}$$

where l is the number of shift operations. Thus, the correlation value obtained by this processing corresponds to the correlation value [see the formula (1)] obtained by the digital signal processing method mentioned in the description of the prior art.

FIGS. 8(a) to 8(c) show examples of the waveform of the signal Vout obtained from the output terminal 17 via the eight step shift operation described above. In the case where a correlation value pattern in which the correlation value reaches a minimum when l=4 is generated as shown in FIG. 8(a), the subject image is determined to be in a focused state; in the case where the correlation value reaches a minimum when l<4 as shown in FIG. 8(b), the subjected image is determined to be in a front mis-focus state; and in the case where the correlation value reaches a minimum when l>4 as shown in FIG. 8(c), the subject image is determined to be in a rear mis-focus state. In addition, the amount by which the subject image is out of focus can simultaneously be detected from the value of l.

As described above, according to this embodiment, the arithmetic operation to obtain correlation values is performed by analog signal processing and the operation speed is therefore considerably high. In addition, since the circuit can be unitized, the phase difference detector can be suitably produced in the form of a semiconductor integrated circuit device. Since the relative accuracy of semiconductor integrated circuit elements, particularly capacitors, is extremely excellent, it is possible to achieve a highly accurate arithmetic operation, together with the utilization of the circuit.

Further, since the shift registers are provided with floating gates and signal charges can therefore be read out repeatedly in a non-destructive manner, it becomes unnecessary to provide a memory for storing signals corresponding to the patterns concerning the subject image. Accordingly, it is possible to provide a small-sized phase difference detector.

Figure 9:
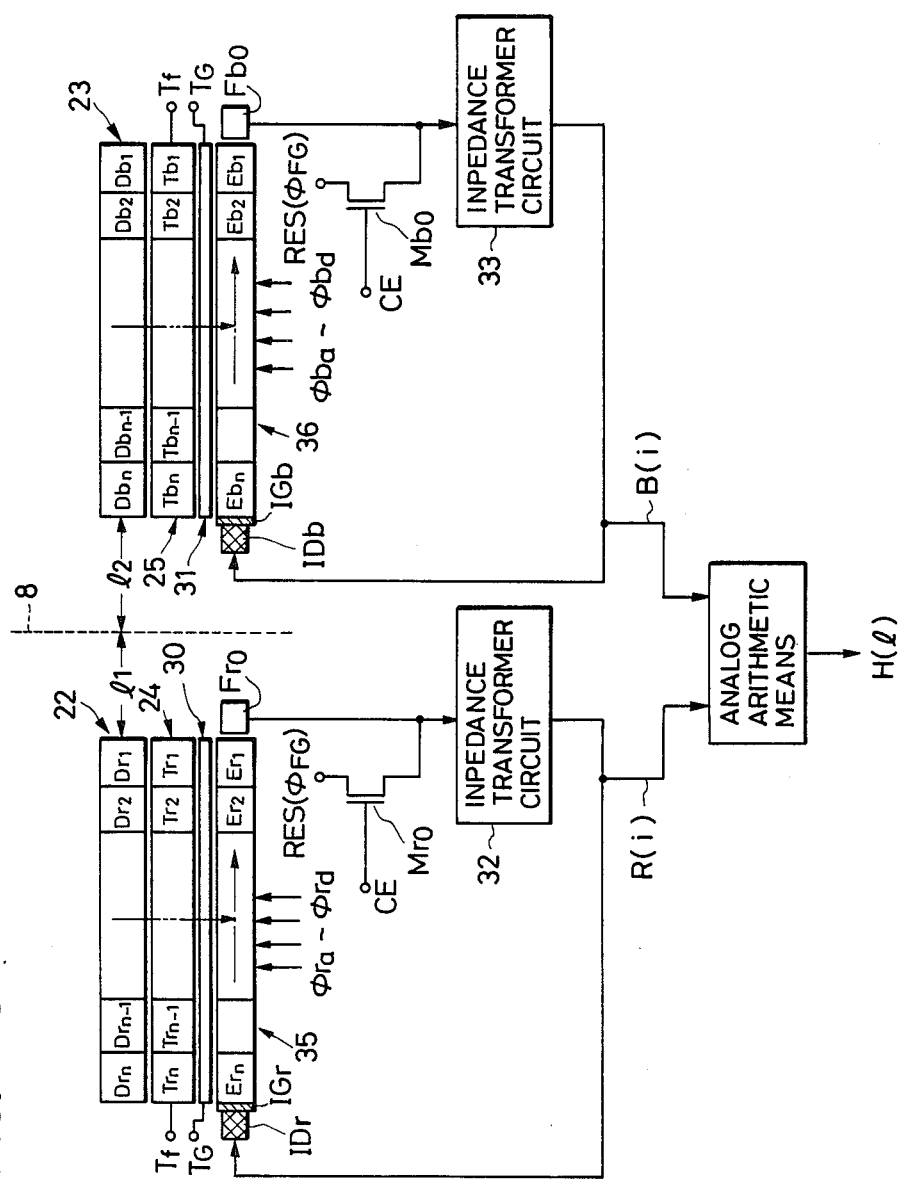
FIG. 9 is a block diagram showing the arrangement of a second embodiment.

Another example of the sensor means shown in FIG. 1 will next be described with reference to FIG. 9. It should be noted that, in FIG. 9, portions which are identical or equivalent to those shown in FIG. 3 are denoted by the same reference numerals.

The arrangement of the sensor means shown in FIG. 9 will first be explained. In the figure, photoelectric transducers Dr1 to Drn which define a light-receiving section 22 on the reference side and photoelectric transducers Db1 to Dbn which define a light-receiving section 23 on the base side are provided at predetermined distances l1 to l2, respectively, with respect to the optical axis 8. The distances l1 and l2 are set in the same manner as in the above-described first embodiment (see FIG. 4).

Further, there are provided charge transfer elements Trl to Trn and Tbl to Tbn corresponding to the photoelectric transducers Drl to Drn and Dbl to Dbn, respectively, so that signal charges which are generated in the photoelectric transducers Drl to Drn and Dbl to Dbn are transferred in parallel to charge transfer elements Erl to Ern and Ebl to Ebn, respectively, which constitute shift register sections 35 and 36, through transfer gates 30 and 31.

The shift register sections 35 and 36 are respectively composed of serial transfer CCDs which transfer signal charges longitudinally (in the direction shown by the arrow in the figure) in response to clock signals $\phi ra$ to $\phi rd$ and $\phi ba$ to $\phi bd$ based on the so-called 4-phase drive system or the like. Floating gates Fr0 and Fb0 are provided so as to be associated with the transfer elements Er1 and Eb1 which are the positions at the leading ends of the shift register sections 35 and 36, respectively, while input circuits which are respectively composed of input gates IGr, IGb and input diodes IDr, IDb are provided for the transfer elements Ern and Ebn positioned at the terminating ends of the shift register sections 35 and 36.

Figure 10:
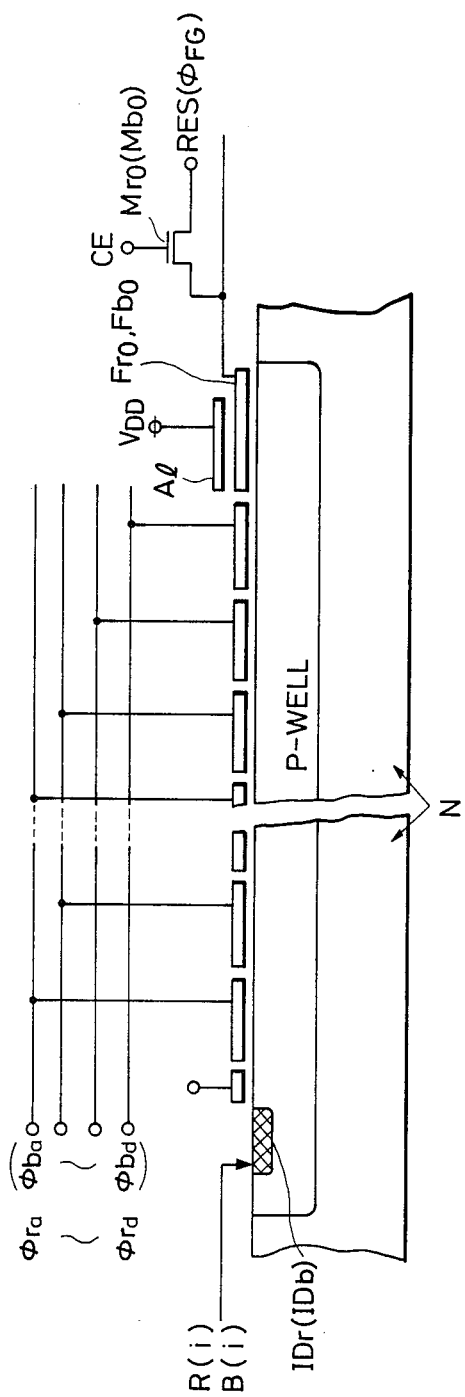
FIG. 10 is a fragmentary vertical sectional view showing the structure of the shift register section shown in FIG. 9.

FIG. 10 is a sectional view schematically showing the vertical sectional structure of the shift register section 35 (36) taken along a longitudinal plane. A P-type diffused layer (P-well) is formed in the surface portion of an N-type semiconductor substrate, and the input diode IDr (IDb) is formed at one end of the P-type diffused layer. Further, the transfer gates IGr and IGb are formed on the semiconductor substrate through a silicon oxide film layer which is stacked on the substrate. The floaing gate Fr0 (Fb0) has a structure similar to that shown in FIG. 5. More specifically, a polycrystalline layer which defines the floating gate Fr0 (Fb0) and an electrode layer A1 which is clamped to the power supply $V_{DD}$ are stacked, and a MOS type FET Mr0 (Mb0) is connected to one end of each floating gate.

Transfer gate electrodes for forming the charge transfer elements Erl to Ern (Ebl to Ebn) are provided between the input circuit and the floating gate Fr0 (Fb0) and are wired so that clock signals $\phi ra$ to $\phi rd$ ($\phi ba$ to $\phi bd$) are applied to the transfer gate electrodes.

Referring back to FIG. 9, the floating gates Fr0 and Fb0 are connected to input terminals of an analog arithmetic means through impedance transformer circuits 32 and 33, respectively. It should be noted that the analog arithmetic means shown in the above-described first embodiment (see FIGS. 2 and 3) or the like may be applied as this analog arithmetic means. Further, signals R(i) and B(i) which are output from the impedance transformer circuits 32 and 33 are supplied to the input diodes IDr and IDb of the input circuits, respectively, so that the signals R(i) and B(i) are input to the transfer elements Ern and Ebn positioned at the terminating ends of the shift register sections 35 and 36.

In this arrangement, the reset signal $\phi FG$ is applied to the reset terminal RES of each of the MOS type FETs Mr0 and Mb0 which are respectively connected to the floating gates Fr0 and Fb0 in response to the control signal CE, whereby the potential wells under the floating gates Fr0 and Fb0 can be controlled as described above with reference to FIG. 5 and signals R(i) and B(i) which correspond to signal charges delivered to the transfer elements Er1 and Eb1 can be read out.

The operation of the above-described second embodiment will be explained with reference to the flowchart shown in FIG. 11.

First, in the routine 100 the photoelectric transducers Drl to Drn and Dbl to Dbn in the light-receiving sections 22 and 23 respectively receive rays of light carrying a pair of optical images and photoelectrically convert the received light. In the routine 110, the generated signal charges are respectively transferred to the charge transfer elements Erl to Ern and Ebl to Ebn of the shift register sections 35 and 36 through the charge transfer elements Trl to Trn and Tbl to Tbn and the transfer gates 30 and 31. Upon the completion of the transfer, the transfer gates 30 and 31 are cut off.

Next, in the routine 120 the shift register sections 35 and 36 shift the signal charges by one pitch on the basis of the clock signals $\phi ra$ to $\phi rd$ and $\phi ba$ to $\phi bd$, and in the subsequent routine 130 signals corresponding to the signal charges are read out from the floating gates Fr0 and Fb0 and are further supplied to the respective charge transfer elements Ern, Ebn through the impedance transformer circuits 32 and 33 again. In the subsequent routine 140, the signals R(1) and B(1) from the impedance transformer circuits 32 and 33 are supplied to the analog arithmetic means. It should be noted that, although the processes executed in routines 120 to 140 are shown separately for convenience of description, the processes are, as a matter of course, executed at the same time.

Next, in the routine 150 it is judged whether or not the transfer operation for n (a predetermined number) pitches has been completed. If NO, the process is repeated from the routine 120.

Accordingly, the signals R(1), B(1), R(2), B(2) ... R(n), B(n) are read out by repeating the processing executed in the routines 120 to 150 n times, and the analog arithmetic means performs an arithmetic operation as follows in the same manner as represented by the above-described formula (3):

$$\sum_{i=1}^{n} |B(i) - R(i)|$$

Then, in the routine 160 a correlation value resulting from this arithmetic operation is output. This first correlation value represents the relationship between the signals R(i) and B(i) in the case where the amount of relative movement between the signals R(i) and B(i) is zero; therefore the first correlation value corresponds to the correlation value H(1) in the case where l−1 in the above-described formula (7).

Next, in the routine 170, it is judged whether or not arithmetic operations to obtain all correlation values H(l) [where l=1 to n] with respect to a predetermined amount l of relative movement have been completed. If YES, the series of processes for calculating correlation values is finished. If NO is the answer, the process proceeds to the routine 180. In the routine 180, the signal charges held in the shift register section 35 on the reference side are shifted by one pitch as a whole and, at the same time, the charge corresponding to the signal charge held in the transfer element ER1 is held in the transfer element Ern. More specifically, in the routine 180 the same operations as those executed in the above-described routines 120 and 130 are effected only for the shift register section 35 on the reference side, whereby the signal charges held in the shift register section 35 on the reference side are shifted by one pitch relative to the signal charges held in the shift register section 36 on the base side. In other words, the operation is equivalent to the operation of changing the amount l of relative movement in the above-described formula (1) to the next subsequent value.

Then, correlation values H(2), H(3) . . . H(l) are successively obtained by processing routines 120 to 170 again, and an arithmetic operation to obtain correlation values which correspond to the formula (1) is eventually executed.

Thus, according to the second embodiment, a plurality of floating gates need not be formed, making it possible to reduce the size and simplify the arrangement.

Figure 11:
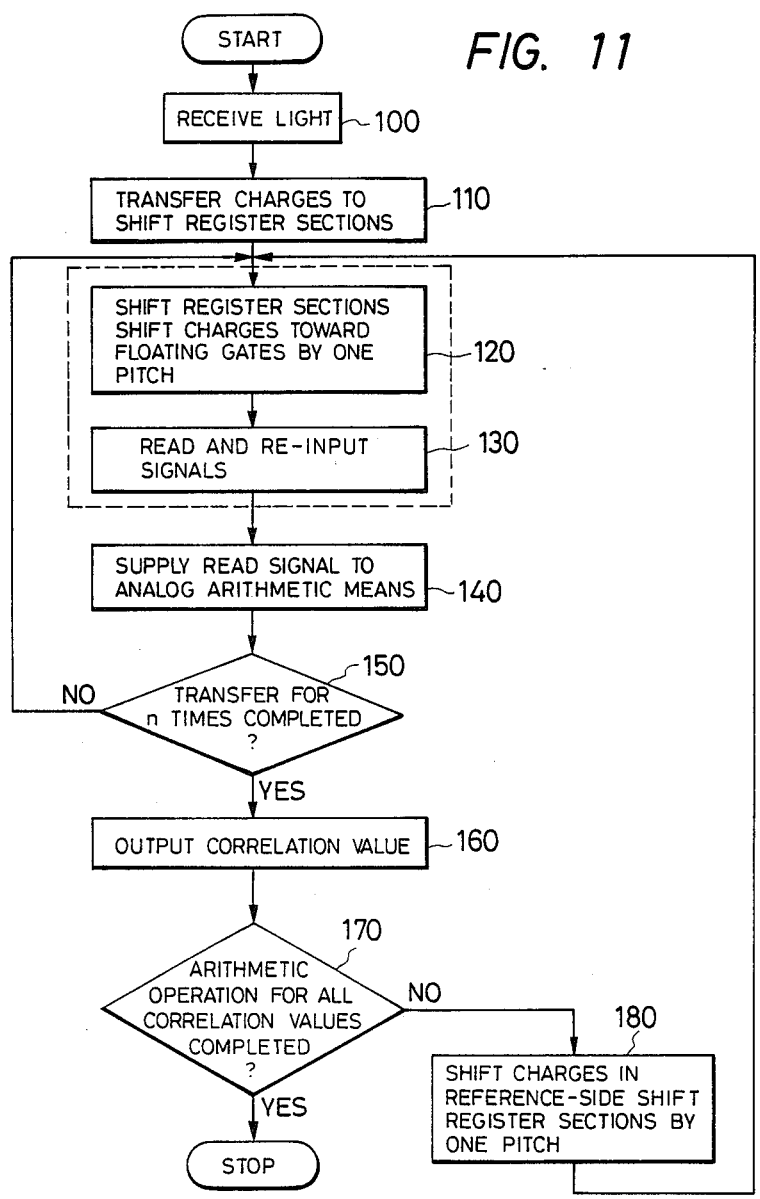
FIG. 11 is a flowchart showing the operation of the second embodiment.

It should be noted that the predetermined judgment processing executed in each of the routines 150 and 170 shown in FIG. 11 may be effected by performing an arithmetic operation a predetermined number of times using a so-called counter.

Still another embodiment will be described hereinunder with reference to FIGS. 12 and 13. In this embodiment, a combination of an analog multiplier 37 and a low-pass filter 38 is employed to serve as the analog arithmetic means shown in FIG. 1. More specifically, as the sensor means, for example, that shown in the first or second embodiment is employed, and the reference-side picture element signal R(i) and base-side picture element signal B(i) which are output from this sensor means are input to the multiplier 37 where they are subjected to multiplication, and the output signal from the multiplier 37 is converted into a direct-current signal in the low-pass filter 38. The output signal H(l) is employed for phase difference detection as a correlation value.

Figure 12:
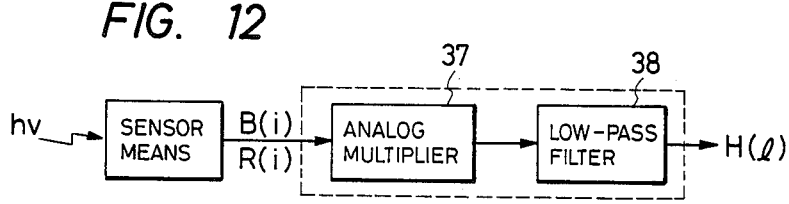
FIG. 12 is a block diagram showing the arrangement of a third embodiment.
Figure 13:
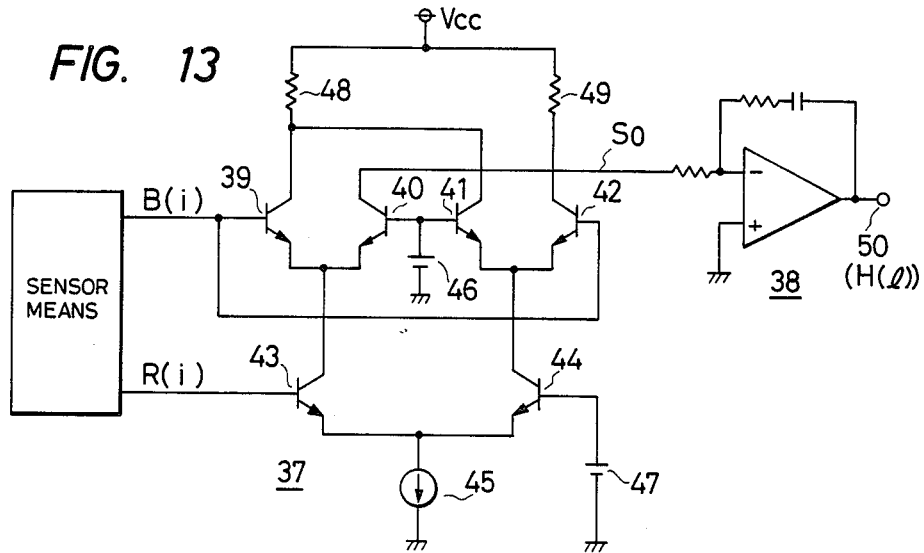
FIG. 13 is a circuit diagram showing in detail the arrangement shown in FIG. 12.

FIG. 13 shows one practical example of the arrangement shown in FIG. 12. The arrangement of the analog multiplier 37 will first be explained with reference to the figure. A first differential pair is defined by NPN transistors 39 and 40, a second differential pair by NPN transistors 41 and 42, and a third differential pair by NPN transistors 43 and 43. The common emitter of the NPN transistors 39 and 40 is connected to the collector of the NPN transistor 43, while the common emitter of the NPN transistors 41 and 42 is connected to the collector of the NPN transistor 44, and the common emitter of the NPN transistors 43 and 44 is connected to a grounding terminal through a constant-current source circuit 45. The common base of the NPN transistors 40 and 41 is biased by a constant-voltage source 46, while the base of the NPN transistor 44 is biased by another constant-voltage source 47. The common base of the NPN transistors 39 and 42 is supplied with the picture element signal B(i) from the sensor means, while the base of the NPN transistor 43 is supplied with the picture element signal R(i) from the sensor means.

Further, the common collector of the NPN transistors 39 and 41 is connected to a power supply Vcc through a resistor 48, while the common collector of the NPN transistors 40 and 42 is connected to the power supply Vcc through a resistor 49. The common collector of the NPN transistors 40 and 42 is connected to an output terminal 50 through the low-pass filter 38. It should be noted that, for the low-pass filter, any known circuit such as the illustrated active filter may be employed, and thus a detailed description thereof is omitted.

Figure 14:
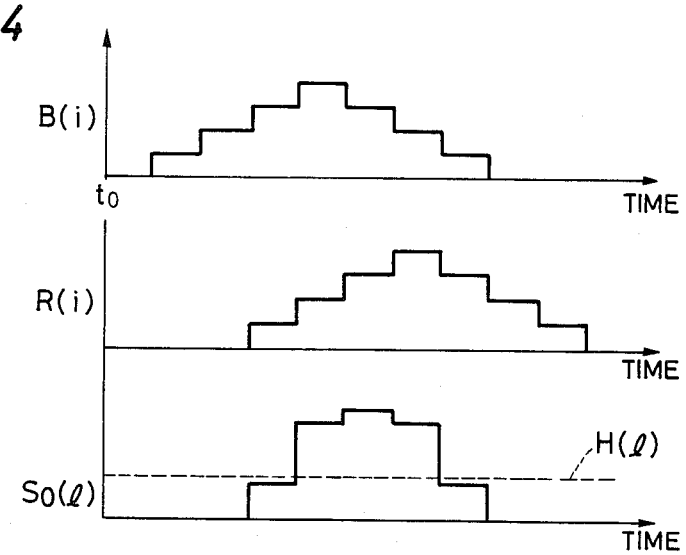
FIG. 14 is a waveform chart showing the function and effect of the third embodiment.

The operation of this embodiment will now be explained. FIG. 14 is a timing chrt which schematically shows the relationship between the signals B(i) and R(i) supplied from the sensor means on the one hand and the signal H(l) generated at the output terminal 50 on the other for the purpose of illustrating the operational principles of this embodiment.

Referring to FIG. 14, when the operation of outputting the picture element signals B(i) and R(i) from the sensor means is started at the time t0, since the signals B(i) and R(i) have a predetermined phase difference therebetween, offset waveforms are supplied to the basis of the NPN transistors 39, 42 and the NPN transistor 43, respectively. The impedances of the NPN transistors 39 to 40 change in accordance with the voltage levels of the signals B(i) and R(i), and multiplication is thereby performed. As a result, a signal $S_0(l)$ such as that illustrated is generated at the collector of the NPN transistor 42. The signal $S_0(l)$ is converted into a DC mean value voltage by means of the low-pass filter 38 and output to the output terminal 50.

Although in the foregoing description the amount l of the relative movement between signals B(i) and R(i) is fixed at a certain value, if the above-described operation is repeated every time the amount l of relative movement is changed successively, output signals H(1), H(2) . . . H(m) for each amount l of relative movement (l=1 to m) can be generated at the output terminal 50. These output signals H(l) [l=1 to m] correspond to those obtained by an arithmetic operation according to the following formula (8) and therefore represent correlation values of the signals B(i) and R(i):

$$H(l) = \sum_{k=1}^{n} |B(k) \times R(k + l - 1)| \tag{8}$$

Thus, employment of the analog arithmetic means formed using an analog multiplier enables further simplification of the circuit and a reduction in size of the apparatus. It should be noted that, in the above-described operation, a predetermined timing control operation is, as a matter of course, carried out in order to effectively obtain only the results H(l) of the arithmetic processing of the signals B(i) and R(i).

Figure 15:
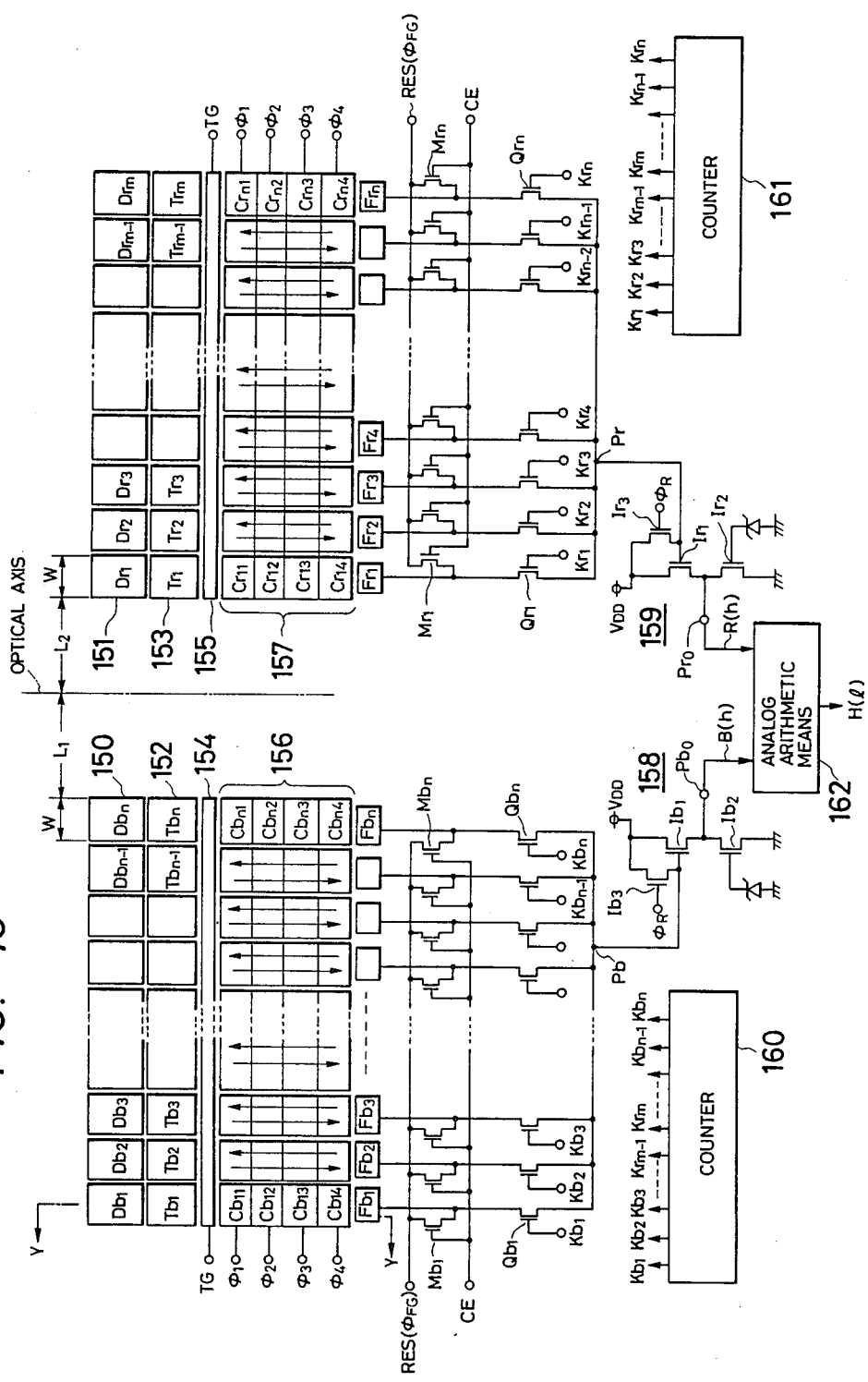
FIG. 15 is a block diagram showing the arrangement of a fourth embodiment.

Still another example of the sensor means will be described with reference to FIGS. 15 to 17.

In the sensor means shown in the embodiment illustrated in FIGS. 2 to 11, the arrangement of the shift registers and the like for shifting signals to be subjected to arithmetic processing and the control thereof are complicated. In addition, as shown in, for example, FIG. 3, one shift register 26 shifts signals to be subjected to arithmetic processing, while the other shift register 27 does not shift signals. Therefore, the operations of the shift registers 26 and 27 are in asymmetry with each other, that is, the registers 26 and 27 have different effects on the signals R(i) and B(i) which are to be subjected to arithmetic processing, and this limits improvements in matching characteristics.

In view of this problem, this embodiment aims at providing a phase difference detector which has a simplified structure and is easy to control and yet capable of improving matching of the signals which are to be arithmetically processed.

To this end, there is provided a phase difference detector designed to judge focusing by detecting relative distances of a pair of subject images formed by a bundle of rays passing through the lens, wherein the improvement comprises: a first light-receiving section defined by photoelectric transducers arranged in a row so as to receive light carrying the first of the pair of images; a first signal read section which transfers in a predetermined direction signals respectively generated in the photoelectric transducers of the first light-receiving section and which outputs the signals in parallel through floating gates of CCDs; a second light-receiving section defined by photoelectric transducers arranged in a row so as to receive light carrying the second of the pair of images; a second signal read section which outputs in a parallel signals respectively generated in the photoelectric transducers of the second light-receiving section through floating gates of CCDs; first signal generating means having means for converting the signals output from the first signal read section in parallel into a first time serial signal to be arithmetically processed and outputting the converted signal; second signal generating means having means for changing the signals output from the second signal read section in parallel into a second time serial signal to be arithmetically processed which has a predetermined phase difference with respect to the first arithmetic signal; and analog arithmetic means adapted to calculate a correlation value on the basis of the first and second arithmetic signals.

The arrangement of this embodiment will first be described with reference to FIG. 15. The embodiment has first and second light-receiving sections 150 and 151 which are respectively defined by photoelectric transducers $D_{bl}$ to $D_{bn}$ and $D_{rl}$ to $D_{rn}$ for photoelectrically converting a pair of subject images formed by the separator lens (see FIG. 20) which is disposed in the optical system of the camera. The light-receiving sections 150 and 151 are disposed in a row in a direction which is perpendicular to the optical axis and at predetermined distances $L_1$ and $L_2$, respectively, with respect to the optical axis. For example, if the pitch width of the photoelectric transducers $D_{bl}$ to $D_{bn}$ and $D_{rl}$ to $D_{rn}$ is assumed to be W, the distance $L_2$ is designed to be equal to a distance determined by adding N pitch widths (N×W) to the distance $L_1$ in order to effect shifting of 2N picture elements (i.e., $L_2=L_1+N\times W$), and each of the right and left picture element rows consists of N picture elements. Further, the light-receiving sections 150 and 151 are respectively provided with storage sections 152, 153, transfer gates 154, 155, and shift register sections 156, 157 in the mentioned order.

More specifically, the storage sections 152 and 153 are respectively defined by CCDs (charge transfer devices) having charge transfer elements $T_{bl}$ to $T_{bn}$ and $T_{rl}$ to $T_{rn}$ corresponding to the photoelectric transducers $D_{bl}$ to $D_{bn}$ and $D_{rl}$ to $D_{rn}$. The shift register section 156 is composed of n sets of CCDs which move signal charges forward and backward in the vertical direction shown by the arrows in the figure for each of the charge transfer elements Tbl to Tbn, while the shift register section 157 is composed of n sets of CCDs which move signal charges forward and backward in the vertical direction shown by the arrows in the figure for each of the charge transfer elements $T_{rl}$ to $T_{rn}$. In other words, the n CCDs are separated from each other and do not effect charge transfer in the horizontal direction. For example, a signal charge which is generated in the charge transfer element $T_{bl}$ is moved through the transfer gate $T_G$ to the CCD consisting of the elements $C_{b11}$ to $C_{b14}$, and the signal charge is reversibly transferred vertically within this CCD only. The same is the case with the other charge transfer elements $T_{b2}, T_{b3} \ldots T_{bn}$, and signal charges are therefore transferred by specific CCDs, respectively. Similarly, n sets of CCDs each consisting of four elements are formed in correspondence with the other charge transfer elements $T_{rl}$ to $T_{rn}$, respectively, to transfer signal charges only in the vertical direction shown by the arrows in the figure. It should be noted that the transfer operation of each CCD is performed at the same period in synchronism with driving signals $\phi_1, \phi_2, \phi_3$ and $\phi_4$ based on the 4-phase drive system.

Further, floating gates $F_{bl}$ to $F_{bn}$ and $F_{rl}$ to $F_{rn}$ are formed adjacent to the charge transfer elements $C_{b14}$ to $C_{bn4}$ and $C_{r14}$ to $C_{rn4}$ which are positioned at the terminating ends of the CCDs. The floating gates $F_{bl}$ to $F_{bn}$ and $F_{rl}$ to $F_{rn}$ are connected to a reset terminal RES through MOS type FETs $M_{bl}$ to $M_{bn}$ and $M_{rl}$ to $M_{rn}$ which are supplied at their gates with a control signal CE, and are also connected to common contacts $P_b$ and $P_r$, respectively, through MOS type FETs $Q_{bl}$ to $Q_{bn}$ and $Q_{rl}$ to $Q_{rn}$ which perform a multiplex operation in response to channel switching signals $K_{bl}$ to $K_{bn}$ and $K_{rl}$ to $K_{rn}$ which are supplied to their gate terminals from counters 160 and 161. The common contacts $P_b$ and $P_r$ are connected to output terminals $P_{bo}$ and $P_{ro}$ through impedance transformer circuits 58 and 59, respectively.

The impedance transformer circuits 58 and 59 have the same circuit configuration. More specifically, the impedance transformer circuits 58 and 59 have MOS type FETs $I_{b1}, I_{b2}$ and $I_{r1}, I_{r2}$ having their drain-source paths series-connected between the power supply $V_{DD}$ and the grounding terminal, and MOS type FETs $I_{b3}$ and $I_{r3}$ which are respectively parallel-connected between the gates and sources of the MOS type FETs $I_{bl}$ and $I_{rl}$ and which are adapted to clamp the respective common contacts $P_b$ and $P_r$ to the power supply $V_{DD}$ when a refresh signal $\phi_R$ is applied thereto. The gates of the MOS type FETs $I_{b2}$ and $I_{r2}$ are biased at a predetermined potential.

Arithmetic signals B(i) and R(i) which are generated at the output terminals $P_{bo}$ and $P_{ro}$ are input to the analog arithmetic means 160 where they are subjected to an arithmetic operation to obtain the difference therebetween, so that correlation values H(l) are obtained on the basis of the above-described formula (1).

The phase difference detector according to this embodiment is fabricated in the form of a semiconductor integrated circuit device. The structure of the floating gates $F_{bl}$ to $F_{bn}$ and $F_{rl}$ to $F_{rn}$ and their vicinities will be explained with reference to a schematic sectional view shown in FIG. 16. It should be noted that FIG. 16 shows a section taken along the line Y-Y in FIG. 15, and since the other floating gates have similar structures, FIG. 16 is employed to representatively show these structures.

Figure 16:
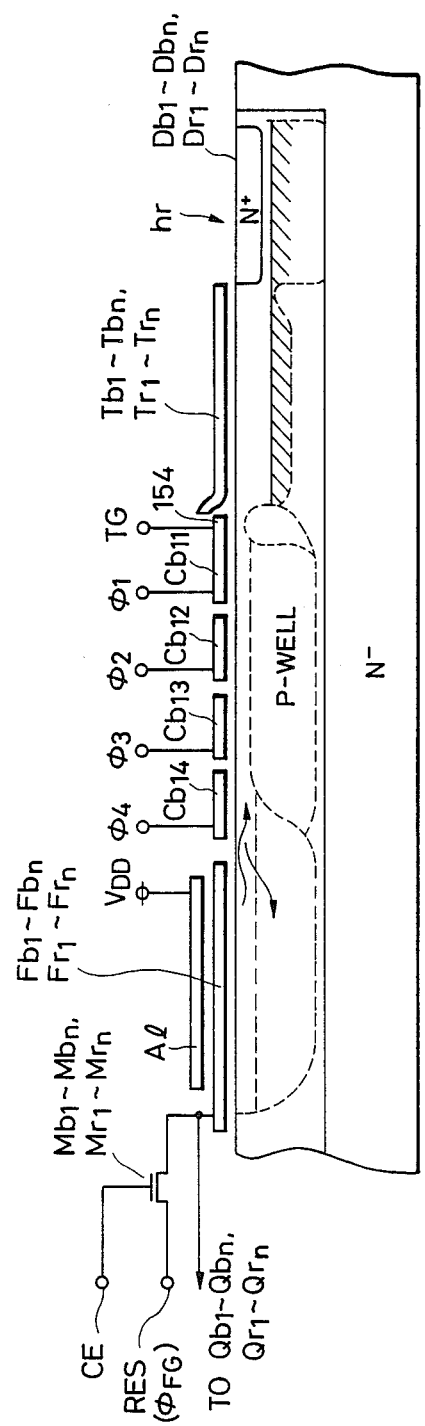
FIG. 16 is a fragmentary sectional view of the embodiment shown in FIG. 15.
Figure 17:
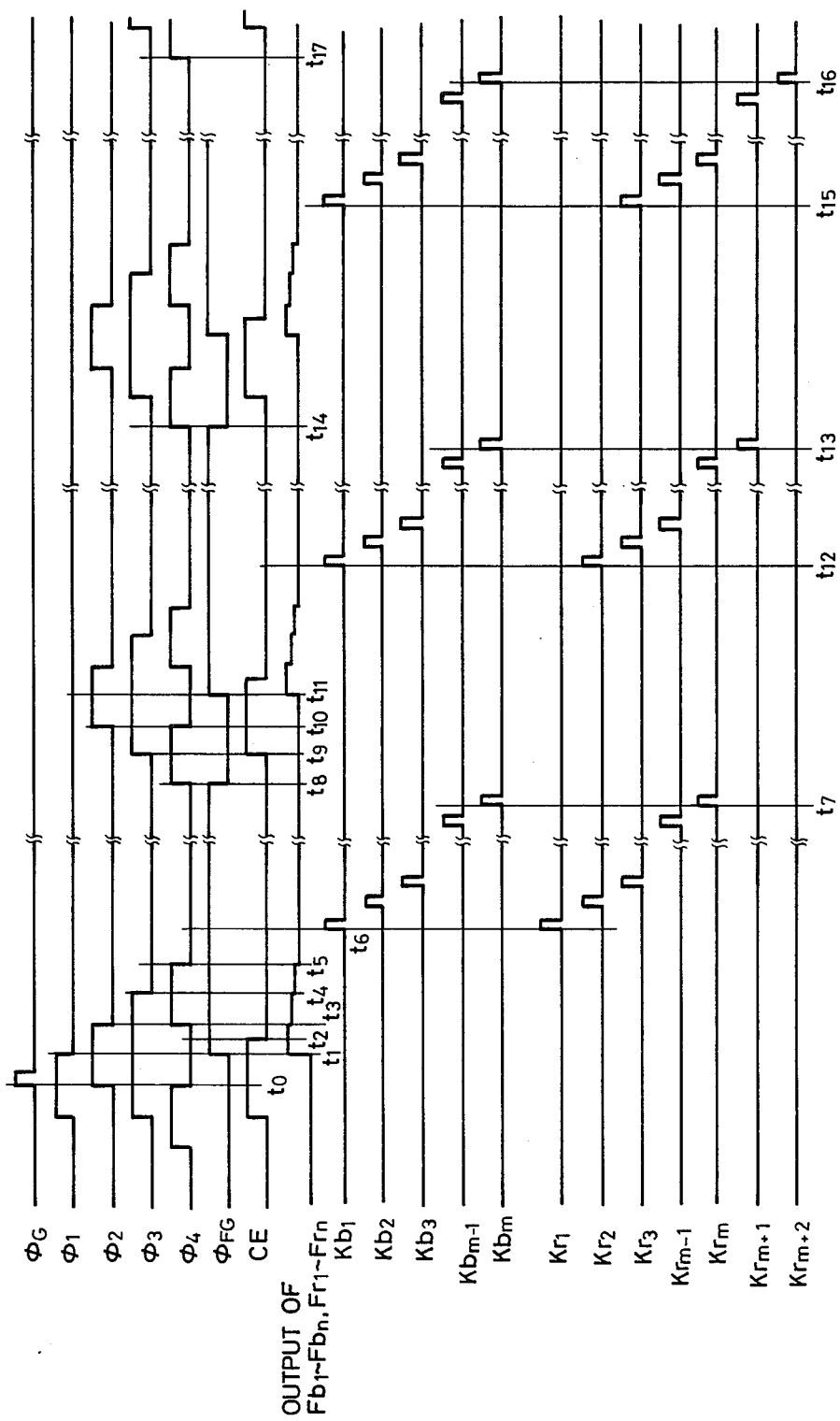
FIG. 17 is a timing chart showing the operation of the fourth embodiment.

In FIG. 16, a P-type diffused layer (P-well) is formed in the surface portion of an N-type semiconductor substrate, and a plurality of N+-type layers are formed in a part of the P-type diffused layer, thereby defining photoelectric transducers which constitute the light-receiving sections 150 (151). Further formed on the semiconductor substrate through a SiO$_2$ layer (not shown) are transfer gate electrode layers respectively defining the charge transfer elements of the storage section 152 (153), a gate electrode layer defining the transfer gate 154 (155), and transfer gate electrode layers respectively defining charge transfer elements of the shift register section 156 (157). Further, a polycrystalline silicon layer for defining the floating gates $F_{bl}$ to $F_{bn}$ and $F_{rl}$ to $F_{rn}$ and an electrode layer Al which is clamped to the power supply $V_{DD}$ are stacked adjacent to each of the shift register sections 156 and 157. The electrode layer Al is formed so as to cover the whole of the upper surfaces of the plurality of floating gates $F_{bl}$ to $F_{bn}$ and $F_{rl}$ to $F_{rn}$. In addition, each of the MOS type FETs $M_{bl}$ to $M_{bn}$ and $M_{rl}$ to $M_{rn}$ is connected to one end of each of the flaoting gates.

In this arrangement, the reset signal $\phi_{FG}$ which is applied to the reset terminal RES is brought to a potential equal to the power supply $V_{DD}$ and, at the same time, the floating gates $F_{bl}$ to $F_{bn}$ and $F_{rl}$ to $F_{rn}$ are clamped to the power supply $V_{DD}$ through the MOS type FETs $M_{bl}$ to $M_{bn}$ and $M_{rl}$ to $M_{rn}$ by the "H" level control signal CE, and the MOS type FETs $M_{bl}$ to $M_{bn}$ and $M_{rl}$ to $M_{rn}$ are then cut off again. In consequence, deep potential wells are formed within the semiconductor substrate as shown by the chain line in FIG. 16, and signal charges in the shift register section 156 (157) flow into the regions under the floating gates $F_{bl}$ to $F_{bn}$ and $F_{rl}$ to $F_{rn}$. Changes in voltage which are caused in accordance with the amount of signal charge flowing therein are generated in the floating gates $F_{bl}$ to $F_{bn}$ ($F_{rl}$ to $F_{rn}$), respectively, so that the pattern of the image formed on the light-receiving section 150 (151) can be detected in the form of voltage signals.

When the floating gates $F_{bl}$ to $F_{bn}$ and $F_{rl}$ to $F_{rn}$ are shifted to the "L" level by bringing the reset terminal RES to the ground potential and, at the same time, turning ON the MOS type FETs $M_{bl}$ to $M_{bn}$ and $M_{rl}$ to $M_{rn}$, the potential wells in the regions under the floating gates become shallow, so that the signal charges can be returned to the shift register section 156 (157). Since such movement of signal charges is effected in a nondestructive manner, reading of signal charges can be repeated any number of times.

The signals which are generated through the floating gates $F_{bl}$ to $F_{bn}$ and $F_{rl}$ to $F_{rn}$ are converted into time serial signals B(i) and R(k) by the multiplex operation of the MOS type FETs $Q_{bl}$ to $Q_{bn}$ and $Q_{rl}$ to $Q_{rn}$ and the signals B(i) and R(k) are output.

The operation of the phase difference detector having the above-described arrangement will next be explained with reference to the timing chart shown in FIG. 17.

It is first assumed that the light-receiving sections 150, 151 and the storage sections 152, 153 photoelectrically convert the patterns of the subject image before the time $t_0$. At the time $t_c$, the signal $\phi_G$ is raised to the "H" level, and the transfer gates 154 and 155 are made conductive for a predetermined period of time. In consequence, the signal charges in the elements $T_{bl}$ to $T_{bn}$ and $T_{rl}$ to $T_{rn}$ are transferred to predetermined potential wells generated at the first- to third-row transfer elements $C_{bl1}$ to $C_{bn1}$, $C_{b12}$ to $C_{bn2}$, $C_{b13}$ to $C_{bn3}$, $C_{rl1}$ to $C_{rnl}$, $C_{r12}$ to $C_{rn2}$, and $C_{r13}$ to $C_{rn3}$ in the shift register sections 156 and 157 in response to the driving signals $\phi_1$, $\phi_2$ and $\phi_3$ which are raised to the "H" level during the period from the time $t_0$ to the time $t_1$.

Next, during the period from the time $t_1$ to the time $t_2$, the signals $\phi_{FG}$ and CE are at the "H" level simultaneously. In consequence, the floating gates $F_{bl}$ to $F_{bn}$ and $F_{rl}$ to $F_{rn}$ are clamped to the power supply voltage $V_{DD}$ and thereby reset. In the meantime, during the period from the time $t_l$ to the time $t_3$, the signals $\phi_1$ and $\phi_4$ are at the "L" level, while the signals $\phi_2$ and $\phi_3$ are at teh "H" level, and the signal charges are therefore held in the second- and third-row transfer elements $C_{b12}$ to $C_{bn2}$, $C_{b13}$ to $C_{bn3}$, $C_{r12}$ to $C_{rn2}$, and $C_{r13}$ to $C_{rn3}$ of the shift register sections 156 and 157.

Next, during the period from the time $t_3$ to the time $t_4$, the signals $\phi_1$ and $\phi_2$ are at the "L" level, while the signals $\phi_3$ and $\phi_4$ are at the "H" level, and the signal charges are therefore transferred to the third- and fourth-row transfer elements $C_{b13}$ to $C_{bn3}$, $C_{b14}$ to $C_{bn4}$, $C_{r13}$ to $C_{rn3}$, and $C_{r14}$ to $C_{rn4}$. Thus, voltage signals corresponding to the signal charges are gradually generated in the floating gates $F_{bl}$ to $F_{bn}$ and $F_{rl}$ to $F_{rn}$, respectively.

Next, during the period from the time $t_4$ to the time $t_5$, the signals $\phi_1$, $\phi_2$ and $\phi_3$ are at the "L" level, while the signal $\phi_4$ is at the "H" level, and after the time $t_5$ the signal $\phi_4$ is also shifted to the "L" level. Therefore, the signal charges which are respectively generated in the elements $T_{bl}$ to $T_{bn}$ and $T_{rl}$ to $T_{rn}$ are held in the potential wells under the predetermined floating gates, and voltages corresponding to the patterns of the subject image are respectively generated in the floating gates $F_{bl}$ to $F_{bn}$ and $F_{rl}$ to $F_{rn}$.

Next, during the period from the time $t_6$ to the time $t_7$, the voltages which are respectively generated in the floating gates $F_{bl}$ to $F_{bn}$ and $F_{rl}$ to $F_{rn}$ are output to the nodes $P_b$ and $P_r$ through the MOS types FETS $Q_{bl}$ to $Q_{bm}$ and $Q_{rl}$ to $Q_{rm}$ which are successively made conductive and nonconductive in synchronism with rectangular switching signals $K_{bl}$ to $K_{bm}$ and $K_{rl}$ to $K_{rm}$ output from the counters 160 and 161, and these voltages are further supplied to the analog arithmetic means 162 through the impedance transformer circuits 58 and 59 in the form of time serial signals B(i) and R(i). More specifically, the counter 160 supplies the analog arithmetic means 162 with m voltage signals among the n voltage signals which are respectively generated in the floating gates $F_{bl}$ to $F_{bn}$ (m<n), and the counter 161 similarly supplies the analog arithmetic means 162 with m voltage signals among the n voltage signals which are respectively generated in the floating gates $F_{rl}$ to $F_{rn}$ (m<n). The analog arithmetic means 162 performs an arithmetic operation to obtain a difference on the basis of the time series signals B(i) and R(i) and outputs a first correlation value H(l). It should be noted that, for the analog arithmetic means 162, any of the examples shown in the above-described embodiments may be employed.

Next, during the period from time $t_8$ to time $t_9$, the signal $\phi_4$ is raised to the "H" level, and during the period from time $t_9$ to the time $t_{10}$ the signals $\phi_3$ and $\phi_4$ are at the "H" level. At the same time, the signal $\phi_{FG}$ is at the "L" level, while the signal CE is raised to the "H" level. Therefore, the floating gates $F_{bl}$ to $F_{bn}$ and $F_{rl}$ to $F_{rn}$ are lowered in potential, and potential values wells are formed under the third- and fourth-row transfer elements $C_{bl13}$ to $C_{bn3}$, $C_{b14}$ to $C_{bn4}$, $C_{r13}$ to $C_{rn3}$ and $C_{r14}$ to $C_{rn4}$ in the shift register sections 156 and 157. Accordingly, the signal charges under the floating gates are returned to the predetermined potential wells formed under the third0 and fourth-row transfer elements.

Further, during the period from time $t_{10}$ to time $t_{11}$, the signals $\phi_2$ and $\phi_3$ are at the "H" level, while the signal $\phi_4$ is shifted to the "L" level. In consequence, the signal charges are returned to the potential wells under the second- and third-row transfer elements $C_{b12}$ to $C_{bn2}$, $C_{13}$ to $C_{bn3}$, $C_{r12}$ to $C_{rn2}$, and $C_{r13}$ to $C_{rn3}$ in the shift register sections 156 and 157.

Next, from time $t_{11}$ to time $t_{12}$, control which is similar to that executed during the period from time $t_1$ to time $t_6$ is effected, and by the time $t_{12}$, voltage signals based on the same signal charges are generated in the floating gates $F_{bl}$ to $F_{bn}$ and $F_{rl}$ to $F_{rn}$, respectively. Since, at this time, the signals $\phi_G$ and $\phi_I$ remain at the "L" level, the signal charges which have once been transferred are not affected by the light-receiving sections 150, 151 and the storage sections 152, 153, and the signals $\phi_G$ and $\phi_I$ are left at the "L" level until a series of arithmetic operations to obtain correlation values is completed.

Next, during the period from time $t_{12}$ to time $t_{13}$, the counter 160 outputs pulse signals $K_{bl}$ to $K_{bm}$ of the same timing as those output during the period from time $t_6$ to time $t_7$, while the counter 161 outputs switching signals $K_{r2}$ to $K^{+1}$ in order to output m voltage signals from the floating gates $F_{r2}$ to $F_{rm+1}$, the switching signals $K_{r2}$ to $K_{rm+1}$ being generated synchronously with the switching signals $K_{bl}$ to $K_{bm}$. Accordingly, time serial signals $B(1)$, $B(2)$ ... $B(m)$ are generated from the output terminal $P_{bo}$, while time serial signals $R(2)$, $R(3)$ ... $R(m)$ and $R(m+1)$ which are out of phase by "1" with respect to the time serial signals $B(i)$ are generated from the output terminal $P_{ro}$. The analog arithmetic means 162 generates a subsequent correlation value $H(2)$ on the basis of the time serial signals $B(i)$ and $R(i+1)$ which are successively output in this way [k=1 to m].

Next, from time $t_{14}$ to time $t_{16}$, control which is similar to that executed during the period from time $t_8$ to time $t_{13}$ is repeated. However, during the period from time $t_{15}$ to time $t_{16}$ where voltage signals are respectively generated in the floating gates $F_{bl}$ to $F_{bn}$ and $F_{rl}$ to $F_{rn}$ again, the counter 161 outputs switching signals $K_{r3}$ to $K_{rm+2}$ successively, while the counter 160 outputs the switching signals $K_{bl}$ to $K_{bm}$ in the same way as in the previous cycle. Accordingly, the time serial signals $B(1)$, $B(2)$ ... $B(m)$ are generated from the output terminal $P_{bo}$, while the time serial signals $R(3)$, $R(4)$ ... $R(m+2)$ which are out of phase by "1" with respect to the time serial signal $R(i+1)$ are generated, and the analog arithmetic means 162 generates a correlation value $H(3)$ on the basis of the time serial signals $B(i)$ and $B(i+2)$.

After the time $t_{17}$, processing which is similar to that executed during the period from time $t_{14}$ to time $t_{16}$ is carried out, and the counter 161 outputs switching signals which are shifted so as to be successively out of phase with respect to the switching signals output from the counter 160. In this way, the analog arithmetic means 162 generates the correlation values $H(l)$ shown in the above-described formula (1).

Thus, according to this embodiment, a pair of subject image patterns are photoelectrically converted, and signal charges thus obtained are read out as voltage signals through floating gates in a non-destructive manner. Further, the read-out signals are converted into time serial signals $B(i)$ and $R(i+1)$ which are shifted so as to be out of phase with respect to each other by predetermined timings [l represents the amount by which the two time serial signals are out of phase with respect to each other] and are then output. Therefore, it is possible to effect high-speed and highly-accurate phase difference detection by performing an analog arithmetic operation based on the time serial signals $B(i)$ and $R(i+1)$. Further, it is possible to achieve considerably excellent matching in terms of the structures and operations for generating the time serial signals $B(i)$ and $R(i+1)$, respectively. In particular, the arrangements and operations of the shift register sections 156 and 157 match favorably, and it is therefore possible to increase the degree of accuracy of arithmetic operation. In addition, this embodiment has achieved advantages in which the prior art is lacking, that is, the control is simplified and the structure effectively utilizes the relative accuracy of the integrated circuit technique.

As still another example of the sensor means, it is also possible to employ techniques using a non-destructive ready type photoelectric transducer as disclosed in Japanese Patent Laid-Open Nos. 56-165473, 58-105672 and 60-12759, incorporated herein by reference.

The subject matter will next be described with reference to FIG. 18, which shows a part corresponding to the one picture element in the sensor means. An $n^+$ region 60 and an $n^-$ region 61 are stacked one upon the other, and $p^+$ regions 62 and an $n^+$ region 63 are buried in the surface portion of the region 61 so as to be adjacent to each other. An electrode which is formed from, for example, polycrystalline silicon or aluminum is stacked on the upper side of the $n^+$ region 63, thus defining a source electrode which uses the $n^+$ region 63 as a source region. On the $p^+$ regions 62 are successively stacked insulator layers 65 defined by a silicon nitride film or the like and transparent electrode layers 66 which define gate electrodes using the $p^+$ regions 62 as gate regions, the $n^+$ region 60 serving as a drain region. It should be noted that the remaining surface portions of the region 60 are covered with a silicon oxide film 67. Further, wirings are connected to the transparent electrode layers 66 for the purpose of applying a bias signal $\phi RST$ to the latter, and a constant-voltage power supply 68, a resistor 69 and a MOS type switching element 70 are series-connected between the source electrode 64 and the drain region 60 as illustrated, the node between the switching element 70 and the resistor 69 defining an output terminal 71.

The operation of the sensor having such a structure will now be explained. With the bias signal $\phi RST$ of predetermined voltage applied to the transparent electrode layers 66, light h from the subject image for phase detection is applied to the surfaces of the transparent electrode layers 66. In consequence, charges which are developed by the incident light are accumulated in the gate regions 62, and when the irradiation is suspended, the gate regions 62 hold charges corresponding to the quantity of light which has been received, without discharging. When, in this state, a control signal $\phi ST$ is applied to the gate of the MOS type switch 70 so as to turn ON the latter, the current from the voltage source 68 flows through the drain region 60 and the source region 63. At this time, the impedance of the channel region 72 (the region shown by the chain line in the figure) between the source and drain is modulated in accordance with the amount of charge held in the gate regions 62, and therefore a voltage signal which is proportional to the quantity of received light is generated at the output terminal 71. Since the charge in the gate regions 62 is held without being discharged, if the MOS type switch 70 is turned ON by the control signal $\phi ST$, the same voltage signal can be obtained repeatedly. It should be noted that in order to erase the charges accumulated in the gate regions 62 it is necessary only to apply a predetermined high voltage to the transparent electrode layers 66. Thus, it becomes possible to receive light again.

Figure 18:
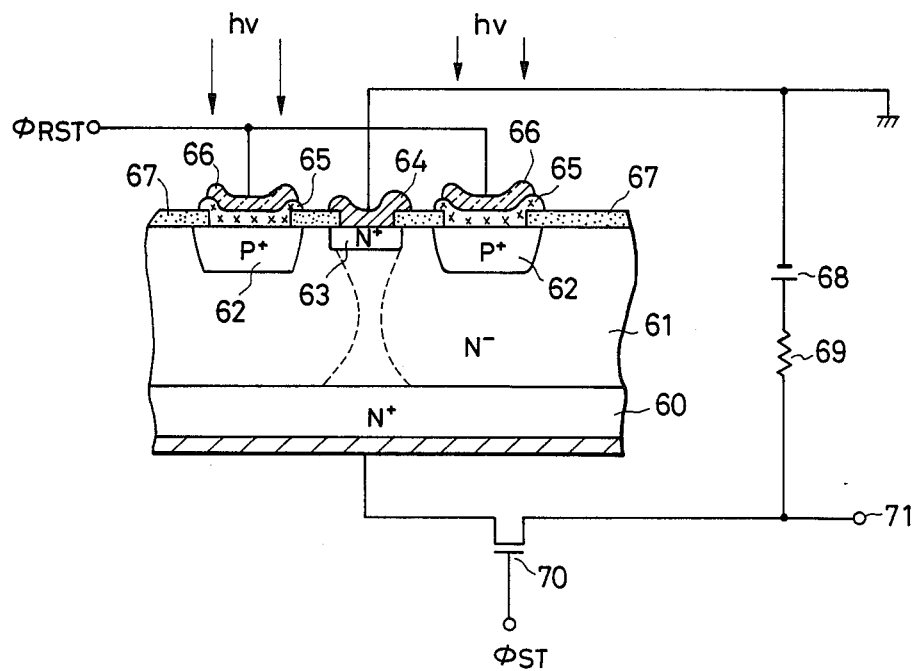
FIG. 18 is a fragmentary sectional view showing the structure of a light-receiving cell which is employed in a fifth embodiment.
Figure 19:
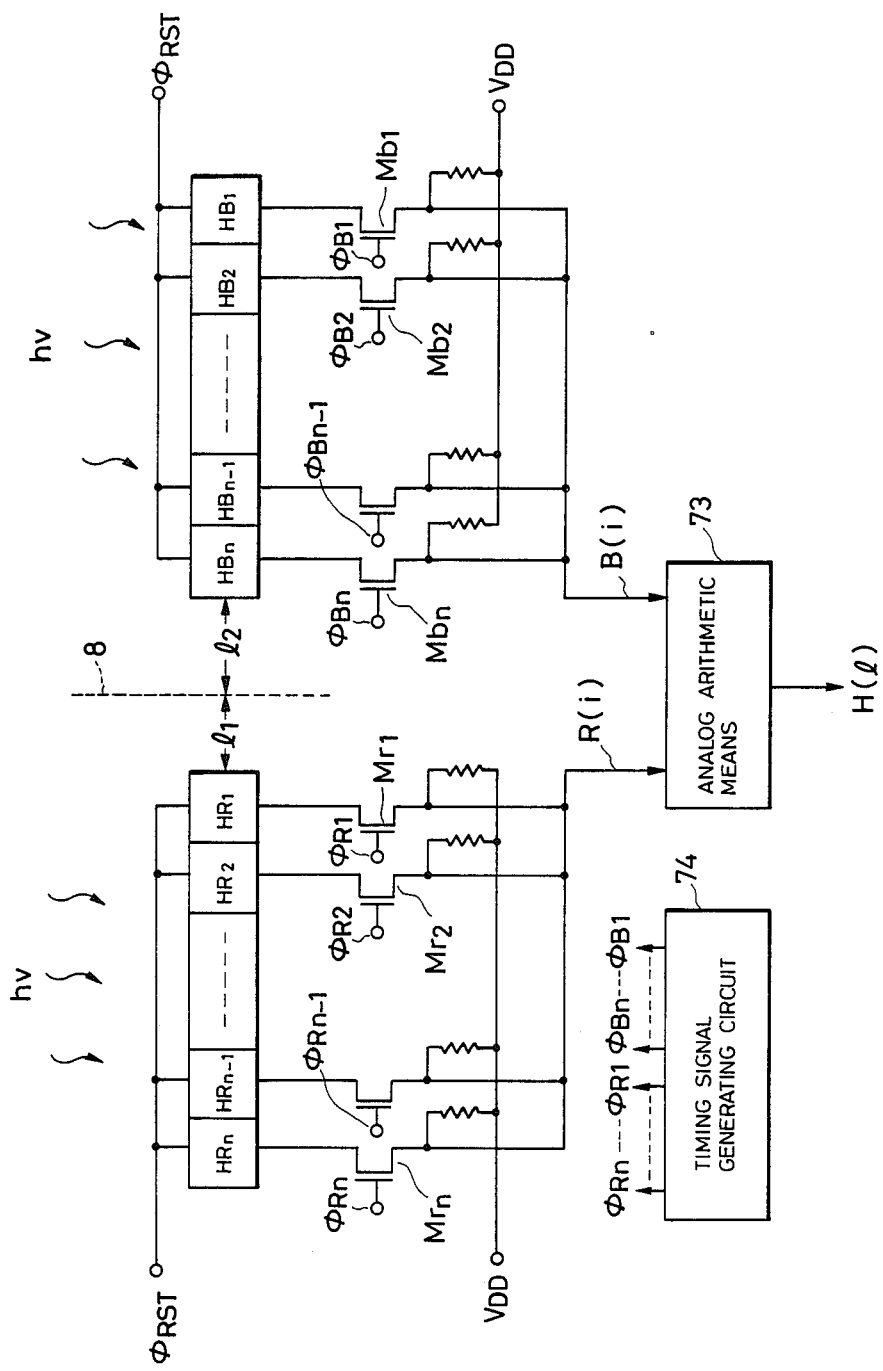
FIG. 19 is a block diagram showing the general arrangement of the fifth embodiment.

FIG. 19 is a block diagram showing the general arrangement of a sensor means formed using the sensor shown in FIG. 18. More specifically, each of the light-receiving cells HR1 to HRn and HB1 to HBn corresponding to the picture elements, respectively, is defined by the sensor shown in FIG. 15, and the bias signal φRST is applied to the cells HR1 to HRn and HB1 to HBn. In addition, MOS type switches MR1 to Mrn and Mb1 to Mbn corresponding to the MOS type switch 70 shown in FIG. 15 are respectively connected to the light-receiving cells HR1 to HRn and LB1 to HBn, and the respective output-side contacts of these switches are mutually connected to an output terminal of an analog arithmetic means 73. Channel switching signals φR1 to φRn and φB1 to φBn corresponding to the control signal φST shown in FIG. 18 are applied to the gate terminals of the MOS type switches Mr1 to μrn and Mb1 to Mbn, respectively. Since these switching signals φR1 to φRn and φB1 to φBn are output from a timing signal generating circuit 74 with a predetermined timing, the MOS type switches Mr1 to Mrn and Mb1 to constitute in combination a demultiplexer.

Although a detailed description of the above-described timing is omitted herein, the signals R(i) and B(i) are respectively read out from the light-receiving cells HR1 to HRn which are equivalent to the reference unit and the light-receiving cells HB1 to HBn which are equivalent to the base unit so that it is possible to execute arithmetic processing according to the above-described formula (1).

As has been described above, the present invention provides a phase difference detector designed to judge the focus of a photographic lens by detecting relative distances of a pair of subject images obtained from a bundle of rays passing through the lens, wherein the improvement comprises a light-receiving section which photoelectrically converts the pair of images; sensor means having a signal read section which reads out a predetermined timing and in a non-destructive manner analog signals respectively corresponding to the pair of images which signals are generated by photoelectric conversion in such a manner that said signals are read out with a predetermined phase difference therebetween; and analog arithmetic means adapted to generate a correlation value between the pair of analog signals output from the sensor means by integrating the absolute value of the difference between the analog electric signals, whereby it is possible to obtain correlation values by arithmetic processing of analog signals without the need to convert them into digital signals. Accordingly, the processing speed is increased, and it is possible to simplify the structure and reduce its size as compared with the conventional phase difference detectors designed to execute digital signal processing.

It should be noted that, although in the above-described embodiments the sensor means and the analog arithmetic means have been explained separately from each other for convenience in description, a phase difference detector which is formed by appropriately combining these means is included within the present invention.

We claim:

1. A phase difference detector of the type capable of distinguishing a focused state by detecting relative positions of a pair of optical images obtained from an object comprising:

sensor means adapted to photoelectrically convert said pair of optical images and to output a first analog electrical signal corresponding to one of the optical images and a second analog electrical signal corresponding to the other optical image, said signals being generated by said photoelectric conversion, at a predetermined period and in a non-destructive manner, wherein said sensor means outputs first and second analog electrical signals without outputting said photoelectrically converted pair of optical images in said sensor means to said analog arithmetic means; and analog arithmetic means for subjecting the pair of analog electrical signals output from said sensor means to a correlative arithmetic operation, said analog arithmetic means receives said first and second analog electrical signals by one of an impedance means and direct connection.

2. A phase difference detector according to claim 1, wherein said sensor means comprises:

a first light-receiving section comprising photoelectric transducers arrayed so as to receive light carrying said first optical image;

a first signal read section which transfers charge signals respectively generated in photoelectric transducers of said first light-receiving section in a predetermined direction and which outputs in parallel electrical signals corresponding to said charge signals;

a second light-receiving section comprising photoelectric transducers array so as to receive light carrying said second optical image;

a second signal read section which outputs in parallel electrical signals corresponding to charge signals respectively generated in photoelectric transducers of said second light-receiving section; and control means adapted to output at a predetermined period the electrical signals output from said first and second signal read sections, thereby outputting analog electrical signals respectively corresponding to said first and second optical images.

3. A phase difference detector according to claim 2, wherein said analog arithmetic means comprises a plurality of charge-storage elements formed in correspondence with the arrays of the photoelectric transducers of said light-receiving sections and charged with said pair of analog electrical signals; means for coupling ends of said charge-storage elements which are adjacent to each other in parallel in accordance with the polarity of the charges accumulated during charging, thereby coupling together all the accumulated charges with their polarities made equal to each other; and means for outputting the amount of charge appearing between the ends of said charge-storage elements as a correlation value.

4. A phase difference detector according to claim 1, wherein said analog arithmetic means comprises an analog multiplier which multiplies said pair of analog electrical signals together to thereby generate a signal corresponding to a correlation value.

5. A phase difference detector according to claim 1, wherein said sensor means comprises:

a first light-receiving section comprising photoelectric transducers arrayed so as to receive light carrying said first optical image;

first signal read means for outputting electrical signals corresponding to charge signals respectively generated in photoelectric transducers of said first light-receiving section in parallel;

a second light-receiving section comprising photoelectric transducers arrayed so as to receive light carrying said second optical image;

second signal read means for outputting electrical signals corresponding to charge signals respectively generated in photoelectric transducers of said second light-receiving section in parallel; and control means for transferring the electrical signals in said first and second signal read means at a predetermined period, thereby outputting the analog electrical signals respectively corresponding to said first and second optical images.

6. A phase difference detector according to claim 1, wherein said sensor means comprises:

a pair of light-receiving sections each comprising a plurality of arrayed cells each having a floating gate portion which stores and holes a charge signal generated by optical pumping, and source and drain portions which are formed adjacent to said floating gate portion so as to define a channel region therebetween; and signal output means adapted to detect an impedance of each of the channel regions, which impedance changes in accordance with a charge signal accumulated in the corresponding floating gate in response to the irradiation of said pair of light-receiving sections with said pair of optical images, thereby generating said pair of analog electrical signals.

* * * * *